United States Patent
Zhou et al.

(10) Patent No.: US 11,758,456 B2
(45) Date of Patent: Sep. 12, 2023

(54) ASSOCIATION REDIRECTION METHOD AND DEVICE

(71) Applicant: ZTE CORPORATION, Guangdong (CN)

(72) Inventors: Chenyun Zhou, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 280 days.

(21) Appl. No.: 16/764,825

(22) PCT Filed: Nov. 19, 2018

(86) PCT No.: PCT/CN2018/116112
§ 371 (c)(1),
(2) Date: May 15, 2020

(87) PCT Pub. No.: WO2019/096290
PCT Pub. Date: May 23, 2019

(65) Prior Publication Data
US 2020/0367127 A1  Nov. 19, 2020

(30) Foreign Application Priority Data

Nov. 17, 2017 (CN) .......................... 201711147185.9

(51) Int. Cl.
*H04W 36/12* (2009.01)
*H04W 28/08* (2023.01)
(Continued)

(52) U.S. Cl.
CPC ....... *H04W 36/12* (2013.01); *H04W 28/0804* (2020.05); *H04W 28/0835* (2020.05); *H04W 28/18* (2013.01); *H04W 36/0033* (2013.01)

(58) Field of Classification Search
CPC ............. H04W 28/08; H04W 28/0804; H04W 28/0835; H04W 28/16; H04W 28/18;
(Continued)

(56) References Cited

U.S. PATENT DOCUMENTS

2009/0252114 A1  10/2009  Hong et al.
2012/0202539 A1   8/2012  Wang et al.
(Continued)

FOREIGN PATENT DOCUMENTS

CN    1400777 A    3/2003
CN  101094240 A   12/2007
(Continued)

OTHER PUBLICATIONS

Office Action for CA 3,082,919 dated Jul. 15, 2021.
(Continued)

*Primary Examiner* — Khoa Huynh
(74) *Attorney, Agent, or Firm* — Knobbe, Martens, Olson & Bear, LLP

(57) ABSTRACT

Provided is an association redirection method. The method includes following steps: a first network element determines a trigger mode for triggering an association redirection of a UE, and the first network element performs the association redirection on the UE according to the determined trigger mode. Further provided are an association redirection apparatus, a processor and a storage medium.

10 Claims, 8 Drawing Sheets

(51) Int. Cl.
*H04W 28/086* (2023.01)
*H04W 28/18* (2009.01)
*H04W 36/00* (2009.01)

(58) Field of Classification Search
CPC ............. H04W 36/00; H04W 36/0011; H04W 36/0033; H04W 36/12; H04W 80/06
See application file for complete search history.

(56) References Cited

U.S. PATENT DOCUMENTS

| | | | |
|---|---|---|---|
| 2016/0242084 A1 | 8/2016 | Campbell | |
| 2016/0301599 A1 | 10/2016 | Porfiri et al. | |
| 2019/0208555 A1* | 7/2019 | Zee | H04W 76/12 |

FOREIGN PATENT DOCUMENTS

| | | |
|---|---|---|
| CN | 102006301 A | 4/2011 |
| CN | 102065565 A | 5/2011 |
| CN | 102651917 A | 8/2012 |
| CN | 104080192 A | 10/2014 |
| CN | 106714247 A | 5/2017 |
| JP | 2012500511 A | 1/2012 |
| KR | 20150049821 | 5/2015 |
| WO | 2015/076708 A1 | 5/2015 |
| WO | WO 2017178929 A1 | 10/2017 |

OTHER PUBLICATIONS

Supplementary European Search Report for EP 18877320.4 dated Jun. 21, 2021.
Qualcomm Incorporated: "Supporting multiple SCTP associations towards the AMF", Jun. 27-29, 2017, 3GPP TSG-RAN WG3 NR#2 AdHoc, XP051308082—R3-172446.
Ericsson: "Way Forward on Multiple SCTP Connections on NG-C", Jun. 27-29, 2017, 3GPP TSG-RAN WG3 NR AdHoc Meeting #2, XP051308181—R3-172613.
Samsung: "Discussion on multiple TNLA and TNLA Binding", Aug. 21-25, 2017, 3GPP TSG-RAN WG3 #97, XP051319825—R3-172985.
Ericsson: "Support of multiple signalling TNL associations per AMF", Aug. 21-25, 2017, 3GPP TSG-RAN WG3 Meeting #97, XP051320041—R3-173212.
Nokia, Nokia Shanghai Bell: "Analysis on NGAP support for multiple-SCTP associations", Oct. 9-13, 2017, 3GPP TSG-RAN WG3 Meeting #97bis, XP051343963—R3-173536.
SA2, "LS reply on N2 requirements and procedures" 3GPP TSG-RAN WG3 #98, Nov. 27-Dec. 1, 2017, R3-174291.
International Search Report of corresponding PCT Application No. PCT/CN2018/116112—6 pages (dated Feb. 14, 2019).
Ericsson, "Signalling Transport of the NG-C Interface", 3GPP TSG-RAN WG3 NR AdHoc Meeting #2, R3-172526—8 pages (dated Jun. 19, 2017).
Huawei, "Multiple SCTP Associations Over NG-C", 3GPP TSG-RAN WG3 Meeting #97, R1-173042—3 pages (Aug. 11, 2017).
Nokia, "Analysis on NGAP Multiple-SCTP Associations", 3GPP TSG-RAN WG3 Meeting #97, R3-173046—5 pages (Aug. 12, 2017).
Korean Office Action dated Dec. 26, 2021 for Korean Patent Application No. 10-2020-7017448. 10 pages.
Chinese Office Action dated Nov. 15, 2021 for Chinese Patent Application No. 201711147185.9. 14 pages.
Office Action for European Application No. 18877320.4 dated Apr. 18, 2023.

* cited by examiner

ASSOCIATION REDIRECTION METHOD AND DEVICE

CROSS-REFERENCE TO RELATED APPLICATIONS

This is a National Stage Application, filed under 35 U.S.C. 371, of International Patent Application No. PCT/CN2018/116112, filed on Nov. 19, 2018, which claims priority to Chinese patent application No. 201711147185.9 filed on Nov. 17, 2017, contents of both of which are incorporated herein by reference in their entireties.

TECHNICAL FIELD

The present disclosure relates to the field of communications and, for example, relates to an association redirection method and apparatus.

BACKGROUND

In 3rd Generation Partnership Project (3GPP), control signaling between communication network elements adopts multiple stream control transmission protocols (SCTP) as underlying transmission protocols to ensure the reliability of signaling transmission. Moreover, the establishment of an SCTP association between a pair of network elements is supported in the latest 3GPP standard.

However, in some application scenarios or abnormal situations, a user stuck in a certain association or a certain network element needs to migrate to a new association, so as to ensure the continuity of the user service.

According to a conclusion of the current standard conference, an access and mobility management function (AMF) may redirect user equipments (UEs) on an SCTP association to SCTP associations within the same AMF or SCTP associations within another AMF. However, it is not clear how the AMF redirects these UEs to new associations. Additionally, the standard also does not specify other methods for redirecting a user of an association between network elements (for example, between a Next Generation NodeB-Centralized Unit (gNB-CU) and a Next Generation NodeB-Distributed Unit (gNB-DU)) that support multiple associations.

SUMMARY

The present disclosure provides an association redirection method and apparatus, to implement an association redirection of a user between network elements that support multiple associations, and to implement to perform the association redirection on the UE from any association in the first network element to an association of another first network element in a scenario where a second network element is connected to multiple first network elements.

The present disclosure provides an association redirection method. The method includes steps described below.

A first network element determines a trigger mode for triggering an association redirection of a UE.

The first network element performs the association redirection on the UE according to the determined trigger mode.

The present disclosure further provides an association redirection method. The method includes steps described below.

A second network element transmits an initial trigger message of a traffic flow of a UE to a first network element.

The second network element receives a redirection request fed back by the first network element through an association receiving the initial trigger message, and redirects the UE to a new association according to the redirection request. Alternatively, the second network element receives a redirection acknowledgement transmitted by the first network element through the new association, where the redirection acknowledgement carries prompt information that the first network element has redirected the UE to the new association.

The present disclosure further provides an association redirection method. The method includes steps described below.

A second network element receives a redirection command transmitted by a first network element through a new association. The redirection command includes an information list of a UE to be redirected to the new association.

The second network element performs an association redirection on the UE according to the redirection command.

The present disclosure further provides an association redirection apparatus, which is applied to a first network element. The apparatus includes a determination module and a redirection processing module.

The determination module is configured to determine a trigger mode for triggering an association redirection of a UE.

The redirection processing module is configured to perform the association redirection on the UE according to the determined trigger mode.

The present disclosure further provides an association redirection apparatus, which is applied to a second network element. The apparatus includes a transmission module and a reception module.

The transmission module is configured to transmit an initial trigger message of a traffic flow of a UE to a first network element.

The reception module is configured to receive a redirection request fed back by the first network element through an association receiving the initial trigger message, and redirect the UE to a new association according to the redirection request; or receive a redirection acknowledgement transmitted by the first network element through the new association, where the redirection acknowledgement carries prompt information that the first network element has redirected the UE to the new association.

The present disclosure further provides an association redirection apparatus, which is applied to a second network element. The apparatus includes a reception module and a redirection processing module.

A reception module is configured to receive a redirection command transmitted by a first network element through a new association. The redirection command includes an information list of a UE to be redirected to the new association.

The redirection processing module is configured to perform an association redirection on the UE according to the redirection command.

The present disclosure further provides a storage medium. The storage medium includes stored programs. The programs, when executed, perform any method described above.

The present disclosure further provides a processor. The processor is configured to execute program. The programs, when executed, perform any method described above.

DETAILED DESCRIPTION

The present disclosure will be described hereinafter in detail with reference to the drawings and in conjunction with the embodiments. If not in collision, the embodiments described herein and the features thereof may be combined with each other.

The terms "first", "second" and the like in the specification, claims and preceding drawings of the present disclosure are used for distinguishing between similar objects and are not necessarily used for describing a particular order or sequence.

Embodiment One

Figure 1:
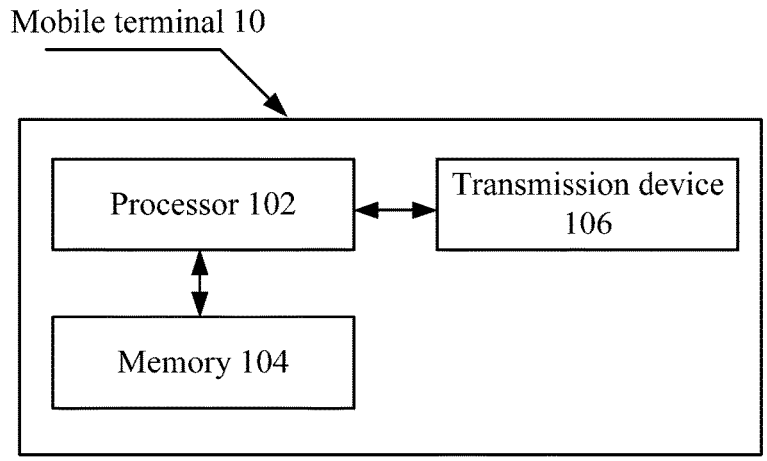
FIG. 1 is a block diagram of hardware of a mobile terminal of an association redirection method according to an embodiment of the present disclosure.

A method embodiment provided by the embodiment one of the present disclosure may be executed in a mobile terminal, a computer terminal or other similar computing apparatuses. Taking the method executed in the mobile terminal as an example, FIG. 1 is a block diagram of hardware of a mobile terminal of an association redirection method according to an embodiment of the present disclosure. As shown in FIG. 1, a mobile terminal 10 may include one or more (only one is shown in FIG. 1) processors 102 (each processor 102 may include, but is not limited to a micro controller unit (MCU), a field-programmable gate array (FPGA) or another processing apparatus), a memory 104 configured to store data, and a transmission device 106 with a communication function. It may be understood by those skilled in the art that the structure shown in FIG. 1 is only illustrative, and not intended to limit the structure of the electronic apparatus described above. For example, the mobile terminal 10 may further include more or fewer components than the components shown in FIG. 1, or may have a configuration different from the configuration shown in FIG. 1.

The memory 104 may be configured to store software programs and modules of application software, for example, program instructions/modules corresponding to the association redirection method in the embodiment of the present disclosure. The processor 102 executes the software programs and modules stored in the memory 104 to perform multiple functional applications and data processing, that is, to perform the preceding method. The memory 104 may include a high-speed random access memory, and may further include a nonvolatile memory such as one or two magnetic storage apparatuses, flash memories or other nonvolatile solid-state memories. In some examples, the memory 104 may include memories that are remotely disposed with respect to the processor 102, and these remote memories may be connected to the mobile terminal 10 via a network. Examples of the preceding network include, but are not limited to, the Internet, an intranet, a local area network, a mobile communication network and combinations thereof.

The transmission device 106 is configured to receive or transmit data via a network. Examples of such a network may include a wireless network provided by a communication provider of the mobile terminal 10. In an example, the transmission device 106 includes a network interface controller (NIC). The NIC may be connected to other network devices via a base station and thus can communicate with the Internet. In an example, the transmission device 106 may be a radio frequency (RF) module. The RF module is configured to communicate with the Internet in a wireless way.

The description "between network elements" mentioned in the embodiment of the present disclosure may refer to "between a gNB and an AMF", "between a gNB-CU and a gNB-DU", "between an evolved NodeB (eNB) and a mobility management entity (MME)" and the like. When a UE accesses, a base station selects an appropriate transport association for the UE according to information carried by the UE during access, and the UE keeps stuck to this association during the subsequent process. This can avoid unnecessary context migration and synchronization, and achieve the best processing performance and user experience. In the embodiment of the present closure, in some application scenarios or abnormal situations, a certain association may be broken due to a failure of an underlying network or be shut down according to requirements of network maintenance, all associations of a network element are out of service due to maintenance or a failure of the network element or other factors, a certain SCTP has a high load, or other factors.

Figure 2:
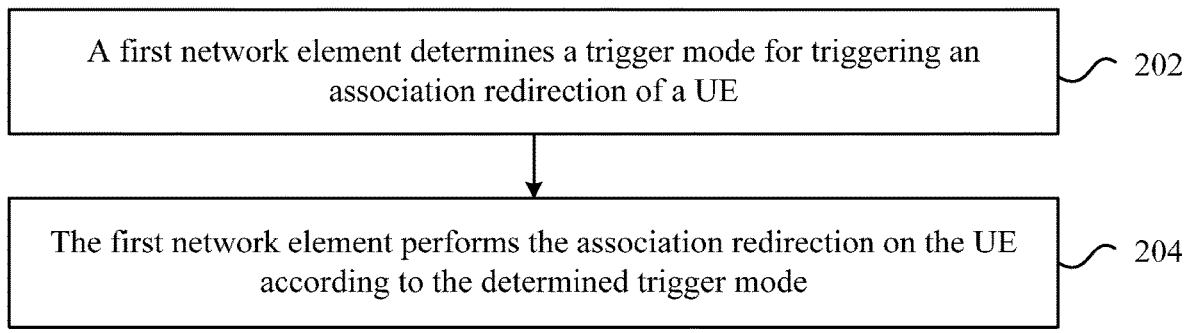
FIG. 2 is a flowchart of an association redirection method according to an embodiment of the present disclosure.

Based on the preceding mobile terminal, an embodiment of the present disclosure provides an association redirection method. FIG. 2 is a flowchart of an association redirection method according to an embodiment of the present disclosure. As shown in FIG. 2, the method includes steps described below.

In step 202, a first network element determines a trigger mode for triggering an association redirection of a UE.

In step 204, the first network element performs the association redirection on the UE according to the determined trigger mode.

According to the preceding steps, the first network element determines the trigger mode for triggering the association redirection of the UE, and the first network element performs the association redirection on the UE according to the determined trigger mode. This can implement an association redirection of a user between network elements that support multiple associations, and can implement to perform the association redirection on the UE from any association in the first network element to an association of another first network element in a scenario where a second network element is connected to multiple first network elements. The association redirection is performed on the user by determining the trigger mode for triggering the association redirection of the UE, so that load imbalance between multiple associations or network elements is avoided, and the effect on the user experience when a certain association or network element fails is avoided.

In an embodiment, the trigger mode includes a procedure message triggering redirection mode, and a redirection mode of a UE in a flow steady state.

In an embodiment, under the condition that the trigger mode is the procedure message triggering redirection mode, the step in which the first network element performs the association redirection on the UE according to the determined trigger mode includes one of steps described below.

The first network element receives an initial trigger message of a traffic flow of the UE transmitted by the second network element, and feeds back a redirection request to the second network element through an association receiving the initial trigger message. The redirection request is used for enabling the second network element to redirect the UE to a new association. The second network element transmits a redirection acknowledgement through the new association to update an association of the UE to the new association.

The first network element receives the initial trigger message of the traffic flow of the UE transmitted by the second network element, and transmits the redirection acknowledgement to the second network element through the new association. The redirection acknowledgement carries prompt information that the first network element has redirected the UE to the new association. Alternatively, the first network element receives the initial trigger message of the traffic flow of the UE transmitted by the second network element, and updates association information of the UE to the association receiving the initial trigger message.

In an embodiment, before the step in which the first network element transmits the redirection acknowledgement to the second network element through the new association, the method further includes a step described below.

The first network element redirects the UE to the new association according to a predetermination or a traffic factor.

In an embodiment, after the step in which the first network element updates the association information of the UE to the association receiving the initial trigger message, the method further includes a step described below.

The first network element replies a redirection acknowledgement to the second network element. The redirection acknowledgement is used for indicating that the association information of the UE has been updated.

In an embodiment, the redirection request includes at least one of a user application layer identifier, a redirection target or an unprocessed-message information element.

The user application layer identifier is configured to identify a user to be redirected.

The redirection target includes a target association and/or a target interface. When the target association is valid, a user is redirected to another association of the network element. When the target interface is valid, the user is redirected to an association of a network element of the same type as the first network element.

The unprocessed-message information element carries an unprocessed flow trigger message delivered by the second network element to the first network element.

In an embodiment, the redirection acknowledgement includes at least one of a user application layer identifier, an old-network-element global-application-identifier information element or an unprocessed-message information element.

The user application layer identifier is configured to identify a user to be redirected.

The old-network-element global-application-identifier information element carries a global application identifier of a network element to which an original association of the UE belongs before the UE is redirected.

The unprocessed-message information element carries an unprocessed message delivered by the second network element to the first network element.

In an embodiment, under the condition that the trigger mode is the redirection mode of the UE in the flow steady state, the step in which the first network element performs the association redirection on the UE according to the determined trigger mode includes steps described below.

The first network element determines a redirection type for redirecting the UE to a new association.

The first network element performs the association redirection on the UE according to the determined trigger mode and the redirection type.

In an embodiment, the redirection type includes the followings: redirecting the UE on an association of the first network element to a new association within the first network element, and redirecting the UE to a network element of the same type as the first network element.

In an embodiment, under the condition that the redirection type is: redirecting the UE on the association of the first network element to the new association within the first network element, the first network element determines the redirection type for redirecting the UE to the new association in one of manners described below.

The first network element determines to redirect a part of UEs on a high-load association to a new low-load association.

The first network element determines an association to be shut down on a basis of maintenance or traffic requirements, and redirects all UEs on the association to be shut down to the new association.

In an embodiment, under the condition that the redirection type is: redirecting the UE to the network element of the same type as the first network element, the first network element determines the redirection type for redirecting the UE to the new association in one of manners described below.

The first network element detects that a load of the first network element is greater than a preset value, and determines to redirect the UE of the first network element to the network element of the same type as the first network element.

The first network element determines, on the basis of maintenance or traffic requirements, to shut down or stop the first network element, and redirects the UE of the first network element to the network element of the same type as the first network element.

In an embodiment, the step in which the first network element performs the association redirection on the UE according to the determined trigger mode and the redirection type includes steps described below.

The first network element selects a UE on the association and to be redirected to the new association within the first network element.

The first network element transmits a redirection command to the second network element through the new association. The redirection command includes an information list of the UE to be redirected to the new association and indicates a redirection between associations within the network element. The redirection command is used for enabling the second network element to redirect the UE to the new association.

In an embodiment, the step in which the first network element performs the association redirection on the UE according to the determined trigger mode and the redirection type includes the step described below.

Under the condition that the first network element selects a target association for redirecting while selecting the UE to be redirected, association information of the UE is updated while the redirection command is transmitted to the second network element.

In an embodiment, the step in which the first network element performs the association redirection on the UE according to the determined trigger mode and the redirection type includes steps described below.

The first network element selects the information list of the UE to be redirected to the new association, and selects a target association to which the UE is redirected.

The first network element allocates the UE to the target association, and transmits a redirection indication through the target association. The redirection indication carries the information list of the UE on which the association redirection is completed.

In an embodiment, the step in which the first network element performs the association redirection on the UE according to the determined trigger mode and the redirection type includes a step described below.

The first network element transmits a redirection command to the second network element. The redirection command carries an information list of the UE to be redirected to the network element of the same type as the first network element. The redirection command is used for indicating the UE to be performed an association redirection between network elements.

In an embodiment, the redirection command includes redirection interface information and/or redirection association information In an embodiment, the redirection interface information includes one of a redirection interface all-user information element, a redirection interface part-user information element, a user application identifier list information element or a target network element identifier list information element.

When the redirection interface all-user information element is valid, all users in the first network element are redirected.

When the redirection interface part-user information element is valid, a part of users in the first network element is redirected.

The user application identifier list information element is configured to carry identifier information of a user to be redirected and includes one or more pieces of user identifier information.

The target network element identifier list information element specifies a candidate target network element for redirecting. If the target network element identifier list is not specified, the second network element selects, according to a load, the network element of the same type as the first network element to serve as the candidate target network element.

In an embodiment, the redirection association information includes a redirection association all-user information element, a redirection association part-user information element, a user application identifier list information element, a target association list information element and a target network element identifier.

When the redirection association all-user information element is valid, all users on the association are redirected.

When the redirection association part-user information element is valid, a part of users on the association is redirected.

The user application identifier list information element is configured to carry identifier information of a user to be redirected on the association and includes one or more pieces of user identifier information.

The target association list information element is valid when an association redirection within the network element is performed. A target association list carries information of a candidate target association.

When the target network element identifier is configured to be valid, an association redirection between network elements is performed and a network element specified by a target network element identifier list in the target association list is used as a candidate network element.

In an embodiment, the redirection indication includes at least one of a redirected-user list information element or an old-network-element application-identifier information element.

The redirected-user list information element carries an information list of a user redirected to an association and includes one or more pieces of user identifier information.

The old-network-element application-identifier information element is configured to request UE context information from an old network element by a new network element in a scenario where a user is performed a cross-network element redirection.

Embodiment Two

Figure 3:
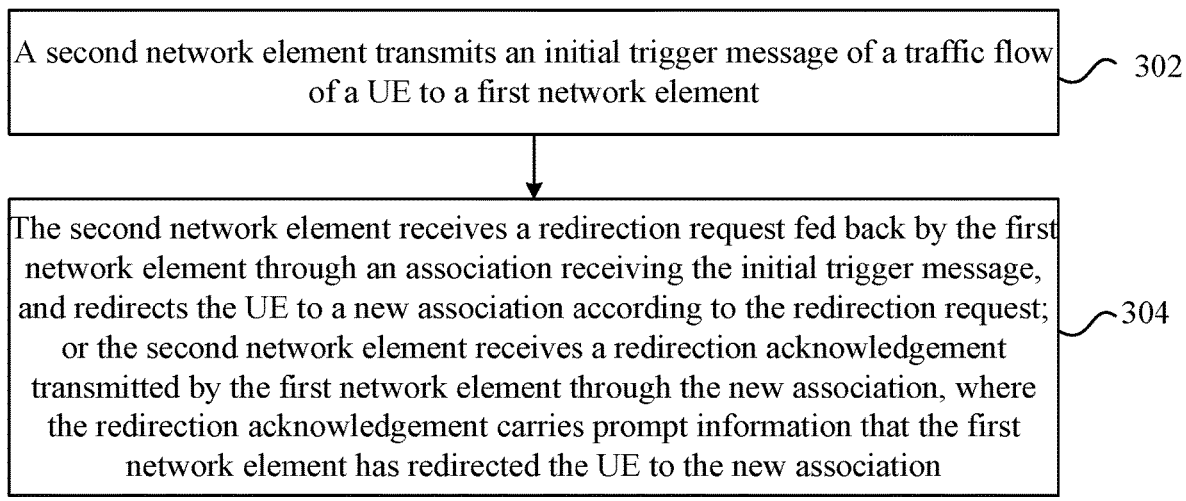
FIG. 3 is a flowchart of another association redirection method according to an embodiment of the present disclosure.

Another embodiment of the present disclosure further provides an association redirection method. FIG. 3 is a flowchart of another association redirection method according to an embodiment of the present disclosure. As shown in FIG. 3, the method includes steps described below.

In step 302, a second network element transmits an initial trigger message of a traffic flow of a UE to a first network element.

In step 304, the second network element receives a redirection request fed back by the first network element through an association receiving the initial trigger message, and redirects the UE to a new association according to the redirection request. Alternatively, the second network element receives a redirection acknowledgement transmitted by the first network element through the new association, where the redirection acknowledgement carries prompt information that the first network element has redirected the UE to the new association.

In an embodiment, before the step in which the second network element redirects the UE to the new association according to the redirection request, the method further includes steps described below.

Under the condition that the redirection request carries an identifier of the new association, the second network element matches the new association according to the identifier of the new association.

Under the condition that the redirection request does not carry the identifier of the new association, the second network element decides and determines the new association.

In an embodiment, the step in which the second network element matches the new association according to the identifier of the new association includes steps described below.

Under the condition that the identifier of the new association indicates transport network layer address (TNLA) information of the new association, the second network element matches the new association according to the TNLA information.

Under the condition that the identifier of the new association indicates a global application identifier of the new network element, the second network element selects a target network element for redirecting according to the global application identifier of the new network element, and selects the new association among transport associations established with the target network element.

Under the condition that the identifier of the new association indicates a new association information element, the second network element selects an association other than a current association within the first network element as the new association.

In an embodiment, after the step in which the second network element redirects the UE to the new association according to the redirection request, the method further includes a step described below.

The second network element transmits a redirection request once through the new association, or feeds back a redirection acknowledgement through the new association.

In an embodiment, the redirection request further carries a user application layer identifier for identifying the UE.

In an embodiment, the redirection request includes at least one of a user application layer identifier, a redirection target or an unprocessed-message information element.

The user application layer identifier is configured to identify a user to be redirected.

The redirection target includes a target association and/or a target interface. When the target association is valid, the user is redirected to another association of the network element. When the target interface is valid, the user is redirected to an association of a network element of the same type as the first network element.

The unprocessed-message information element carries an unprocessed flow trigger message delivered by the second network element to the first network element.

In an embodiment, the redirection acknowledgement includes at least one of a user application layer identifier, an old-network-element global-application-identifier information element or an unprocessed-message information element.

The user application layer identifier is configured to identify a user to be redirected.

The old-network-element global-application-identifier information element carries a global application identifier of a network element to which an original association of the UE belongs before the UE is redirected.

The unprocessed-message information element carries an unprocessed message delivered by the second network element to the first network element.

Embodiment Three

Figure 4:
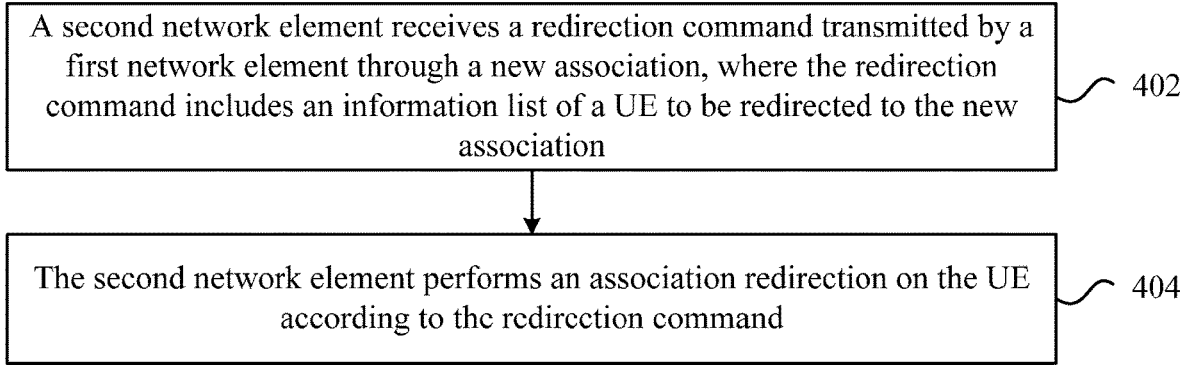
FIG. 4 is a flowchart of another association redirection method according to an embodiment of the present disclosure.

Another embodiment of the present disclosure further provides an association redirection method. FIG. 4 is a flowchart of another association redirection method according to an embodiment of the present disclosure. As shown in FIG. 4, the method includes steps described below.

In step 402, a second network element receives a redirection command transmitted by a first network element through a new association. The redirection command includes an information list of a UE to be redirected to the new association.

In step 404, the second network element performs an association redirection on the UE according to the redirection command.

In an embodiment, the step in which the second network element performs the association redirection on the UE according to the redirection command includes a step described below.

Under the condition that the redirection command is used for indicating a redirection between associations within a network element, the second network element selects one or more new associations for the UE in the redirection command according to the redirection command, and allocates the UE to be redirected to the one or more selected new associations.

In an embodiment, the method further includes a step described below.

The second network element constructs a redirection indication according to the one or more selected new associations and the allocated UE, and transmits the redirection indication to the first network element through the one or more associations. The redirection indication is used for the first network element to update association information for the UE.

In an embodiment, the method further includes a step described below.

Under the condition that the redirection command is used for indicating the redirection between associations within the network element and further carries a target association to which the UE is redirected, the second network element updates association information of the UE according to the information list of the UE carried in the redirection command and the target association while receiving the redirection command.

In an embodiment, the step in which the second network element performs the association redirection on the UE according to the redirection command includes steps described below.

Under the condition that the redirection command is used for indicating the redirection between associations within the network element, the second network element receives a redirection indication transmitted by the first network element through a target association to which the UE is allocated. The redirection indication carries an information list of the UE on which the association redirection has been completed.

The second network element updates, according to the redirection indication, an association of the user to an association receiving the redirection indication.

In an embodiment, the method further includes steps described below.

Under the condition that the redirection command is used for indicating that the UE is to be performed an association redirection between network elements, the second network element receives the redirection command. The redirection command carries an information list of a UE to be redirected to a network element of the same type.

The second network element selects the new association according to association load information of the network element which is connected to the first network element and has the same type as the first network element, and allocates the UE to the new association according to the information list of the UE.

In an embodiment, the method further includes a step described below.

The second network element transmits a redirection indication to the network element of the same type as the first network element. The redirection indication is used for enabling the network element of the same type as the first network element to redirect the UE to the new association. The redirection indication carries an information list of the allocated UE and an application identifier of the first network element which serves the UE.

In an embodiment, the method further includes a step described below.

Under the condition that the first network element determines a target network element or a target association while selecting the UE to be redirected and is capable of notifying the target network element to update association information of the UE, the second network element abandons transmitting the redirection indication to the target network element.

In an embodiment, the redirection command includes redirection interface information and/or redirection association information In an embodiment, the redirection interface information includes one of a redirection interface all-user information element, a redirection interface part-user information element, a user application identifier list information element or a target network element identifier list information element.

When the redirection interface all-user information element is valid, all users in the first network element are redirected.

When the redirection interface part-user information element is valid, a part of users in the first network element is redirected.

The user application identifier list information element is configured to carry identifier information of a user to be redirected and includes one or more pieces of user identifier information.

The target network element identifier list information element specifies a candidate target network element for redirecting. If the target network element identifier list is not specified, the second network element selects, according to a load, the network element of the same type as the first network element to serve as the candidate target network element.

In an embodiment, the redirection association information includes a redirection association all-user information element, a redirection association part-user information element, a user application identifier list information element, a target association list information element and a target network element identifier.

When the redirection association all-user information element is valid, all users on the association are redirected.

When the redirection association part-user information element is valid, a part of users on the association is redirected.

The user application identifier list information element is configured to carry identifier information of a user to be redirected on the association and includes one or more pieces of user identifier information.

The target association list information element is valid when an association redirection within the network element is performed. A target association list carries information of a candidate target association.

When the target network element identifier is configured to be valid, an association redirection between network elements is performed and a network element specified by a target network element identifier list in the target association list is used as a candidate network element.

In an embodiment, the redirection indication includes at least one of a redirected-user list information element or an old-network-element application-identifier information element.

The redirected-user list information element carries an information list of a user redirected to an association and includes one or more pieces of user identifier information.

The old-network-element application-identifier information element is configured to request UE context information from an old network element by a new network element in a scenario where a user is performed a cross-network element redirection.

The embodiments of the present disclosure support a method for redirecting one or more users accessing to a certain association to a new SCTP association between network elements that support multiple transport associations, and a method for redirecting a user to a new association between associations of multiple network element clusters. This avoids load imbalance between multiple SCTP associations, and avoids poor performance or user disconnection caused by out of service (including out of service caused by artificial intervention) of a part of associations or network elements to affect the user experience. When a network element at one end decides to redirect a UE to another SCTP association, different implementation schemes are adopted according to the current flow state of the UE, whether the new association after the redirection belongs to the same network element as the old association before the redirection, and the number of UEs to be redirected.

A redirection triggered by a procedure messages includes steps described below.

The first network element receives a flow trigger message (referring to the first message that triggers a new traffic flow) of the UE. The first network element may determine to redirect the UE to another association according to the current association state.

If the UE is redirected to another association within the first network element or an association within the network element of the same type as the first network element, the first network element may reply a "redirection request" message to the second network element through an SCTP association receiving the message. The "redirection request" message includes an initial request message previously received by the second network element. Additionally, the "redirection request" message may carry "new association identifier" information (such as a TNLA of the new association, or a global application identifier of the new network element if the UE is expected to be redirected to another network element). Alternatively, the "redirection request" message does not carry a related information element of the new association, and the target association is decided by the second network element. Moreover, the message further carries "user application layer identifier" information for identifying a user between network elements.

Figure 5:
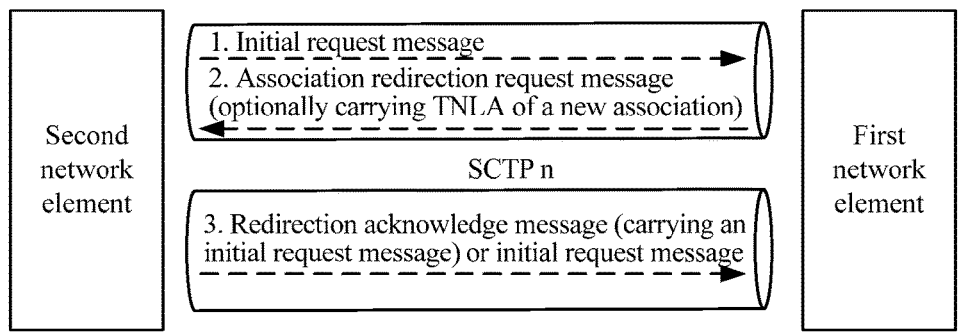
FIG. 5 is a processing diagram of redirecting a UE to another SCTP association of the same network element according to an embodiment of the present disclosure.
Figure 6:
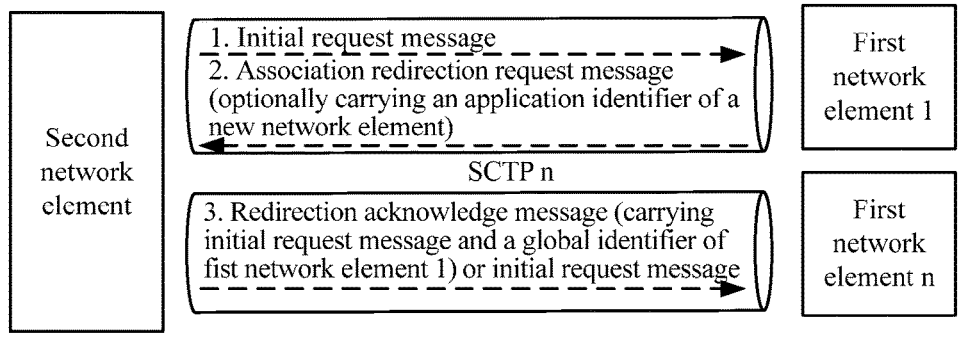
FIG. 6 is a processing diagram of redirecting a UE to an SCTP association of another network element of the same type according to an embodiment of the present disclosure.

FIG. 5 is a processing diagram of redirecting a UE to another SCTP association of the same network element according to an embodiment of the present disclosure. FIG. 6 is a processing diagram of redirecting a UE to an SCTP association of another network element of the same type according to an embodiment of the present disclosure. As shown in FIGS. 5 and 6, the second network element selects the new association for the UE according to the "redirection request" message. The method includes the following steps: if the new association identifier information indicates TNLA information of the new association, the SCTP association is matched according to the TNLA information; if the new association identifier information indicates the global application identifier of the new network element, the target network element for redirecting is firstly selected by using this information, and then an appropriate SCTP association is selected among transport associations established between the second network element and the target network element; if the new association identifier information indicates a new association information element, another association within the first network element is selected, and then a message carried in the redirection message is retransmitted once or a redirection acknowledge message is replied through the newly selected association. In the case of the cross-network element redirection, the message carries a global application identifier of the first network element before the redirection to convenient for the new network element fetching the context of the user. In an embodiment, n in the drawings represents a serial number, such as a serial number of the SCTP association, or a serial number of the first network element.

Figure 7:
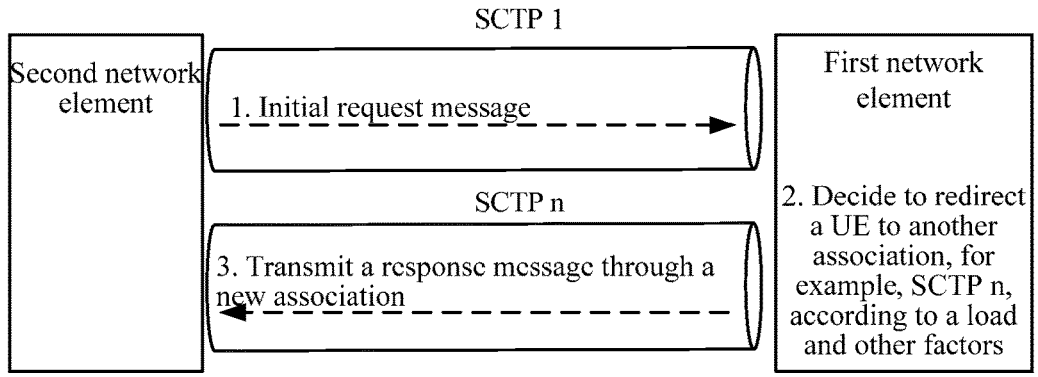
FIG. 7 is a processing diagram illustrating that a first network element implicitly redirects a UE to another association of the first network element according to an embodiment of the present disclosure.

Additionally, FIG. 7 is a processing diagram illustrating that a first network element implicitly redirects a UE to another association of the first network element according to an embodiment of the present disclosure. As shown in FIG. 7, to reduce the two interaction delays caused by the preceding method, after the first network element processes the flow trigger message, the first network element replies a response message to the second network element through the new association to implicitly change the transport association of the UE. When the second network element receives the response message through the new association, it is indicated that the first network element redirects the UE to this association, so the second network element also redirects the association information of the UE to this association.

Figure 8:
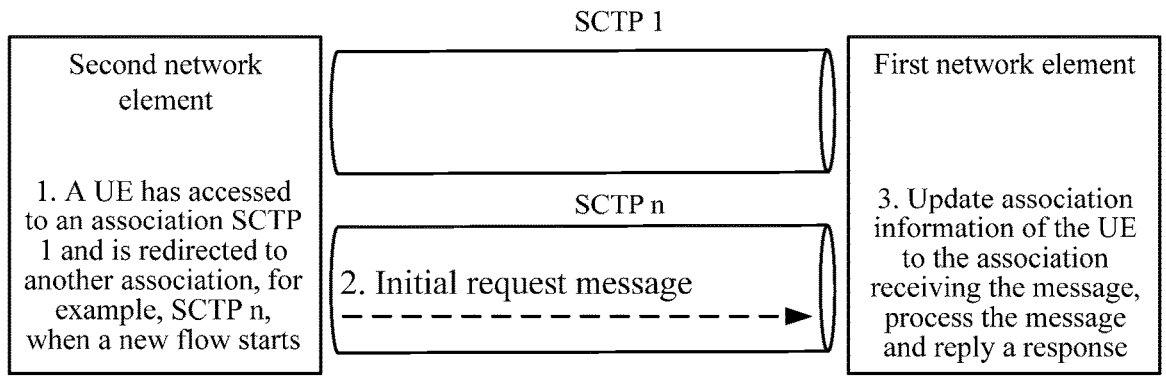
FIG. 8 is a processing diagram of changing a transport association through an initial message of a second network element according to an embodiment of the present disclosure.

FIG. 8 is a processing diagram of changing a transport association through an initial message of a second network element according to an embodiment of the present disclosure. As shown in FIG. 8, it is assumed that the UE has accessed to a certain association. When a new flow is started, a network element initiating the flow transmits a flow request message (or a one-way indicating message) through the new association, and redirects the UE to this association. A network element receiving the message also redirects the UE to the new association receiving the message.

In addition to the preceding application procedure message, the embodiment of the present disclosure also relates to two user-level messages: the "redirection request" message and the "redirection acknowledge" message. The "redirection request" message includes one or more pieces of information: a "user application layer identifier", a "redirection target" or an "unprocessed-message" information element.

The "user application layer identifier" is configured to identify a user to be redirected.

The "redirection target" includes a "target association" and/or a "target interface".

When the "target association" is valid, it is indicated that the user is redirected to another association of the network element. This information element carries an optional "target TNLA" information element, that is, a target association address. If the message carries the "target TNLA" information element, the user is redirected to a specified association, and otherwise, the user is redirected to another association of the first network element.

When the "target interface" is valid, it is indicated that the user is redirected to the association of the network element of the same type as the first network element. This information element carries an optional "target-network-element global application identifier". If the message carries the "target-network-element global application identifier", the user is redirected to an association of a specified network element, and otherwise, the second network element selects an appropriate association of the network element of the same type as the first network element for the user.

The "unprocessed-message" information element carries an unprocessed flow trigger message delivered by the second network element to the first network element.

The "redirection acknowledgement" message includes one or more pieces of information: a "user application layer identifier", an "old-network-element global-application-identifier" information element or an "unprocessed-message" information element.

The "user application layer identifier" is configured to identify a user to be redirected.

The "old-network-element global-application-identifier" information element carries a global application identifier of a network element to which an original association of the UE belongs before the UE is redirected.

The "unprocessed-message" information element carries an unprocessed flow trigger message delivered by the second network element to the first network element.

Under the condition that UEs are in a flow steady state redirection, the flow steady state means that the UEs have established contexts in the first network element and the second network element and have no traffic flow to process when the redirection is to be triggered. In this state, it is expected to redirect a part of users or all users to other associations in scenarios described below.

The first network element discovers, through monitoring or traffic means, that some associations of the first network element have high loads, and thus expects to redirect a part of the users on these associations to low-load associations.

For maintenance or traffic requirements, it is expected to shut down a certain transport association and redirect all users on this association to other associations.

If the first network element has a high load, it is expected to redirect the user of the first network element to another network element of the same type.

For maintenance or traffic requirements, it is expected to shut down or stop the first network element and redirect the user to another network element.

Figure 9:
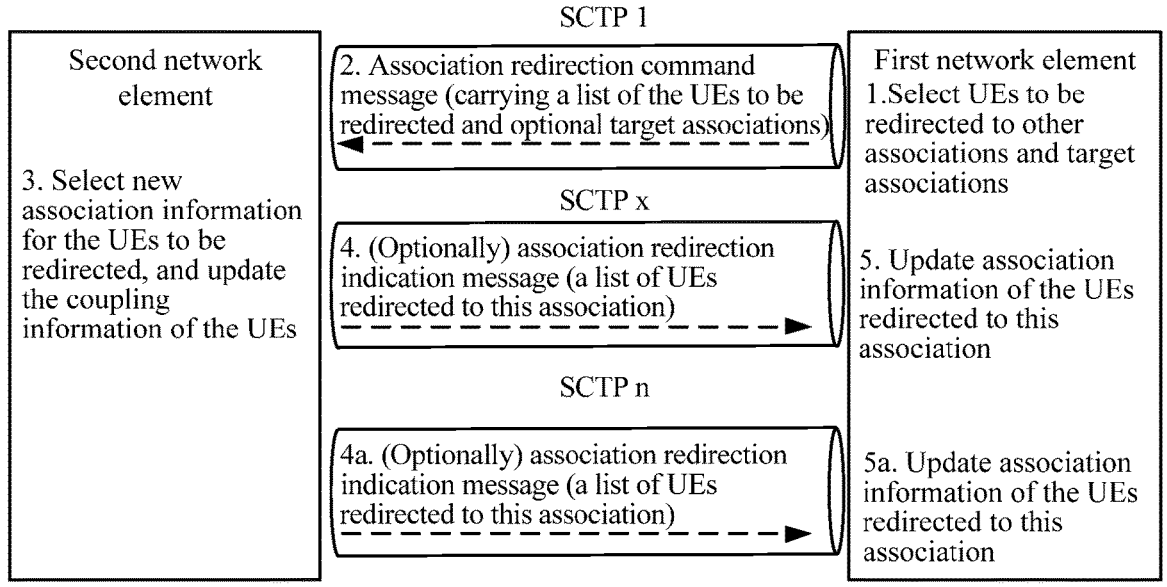
FIG. 9 is a processing diagram illustrating that a first network element triggers a steady-state UE to redirect the steady-state UE to another association of the first network element according to an embodiment of the present disclosure.

FIG. 9 is a processing diagram illustrating that a first network element triggers a steady-state UE to redirect the steady-state UE to another association of the first network element according to an embodiment of the present disclosure. As shown in FIG. 9, if a UE on a certain association of the first network element is redirected to another association within the first network element, the first network element selects the UE on the certain association and to be redirected to another association, transmits a "redirection command" message to a second network element through the certain association, where the message includes an information list of the UE to be redirected to another association, and indicates a redirection between associations within the first network element. The second network element receives the "redirection command" message, selects an appropriate SCTP association for the UE in the message. The second network element may select multiple new associations for the UE in the list, and allocates the UE to be redirected to the selected association. The second network element constructs a "redirection indication" message according to the selected new association and the allocated UE, and transmits the "redirection indication" message to the first network element through the corresponding association. The first network element updates association information of the corresponding UE according to a UE list in the redirection indication message.

If the first network element has selected a target association for redirecting while selecting the UE to be redirected, association messages of these UEs to be redirected are updated while the "redirection command" message is transmitted to the second network element. When receiving the "redirection command" message, the second network element updates, according to the target association for redirecting and the UE to be redirected in the message, the association information of the UE to be redirected. Thus, it is not necessary to transmit messages in steps 4 and 4a of FIG. 9, and the step in which the first network element updates the association information of the UE is adjusted to be after step 1.

Figure 10:
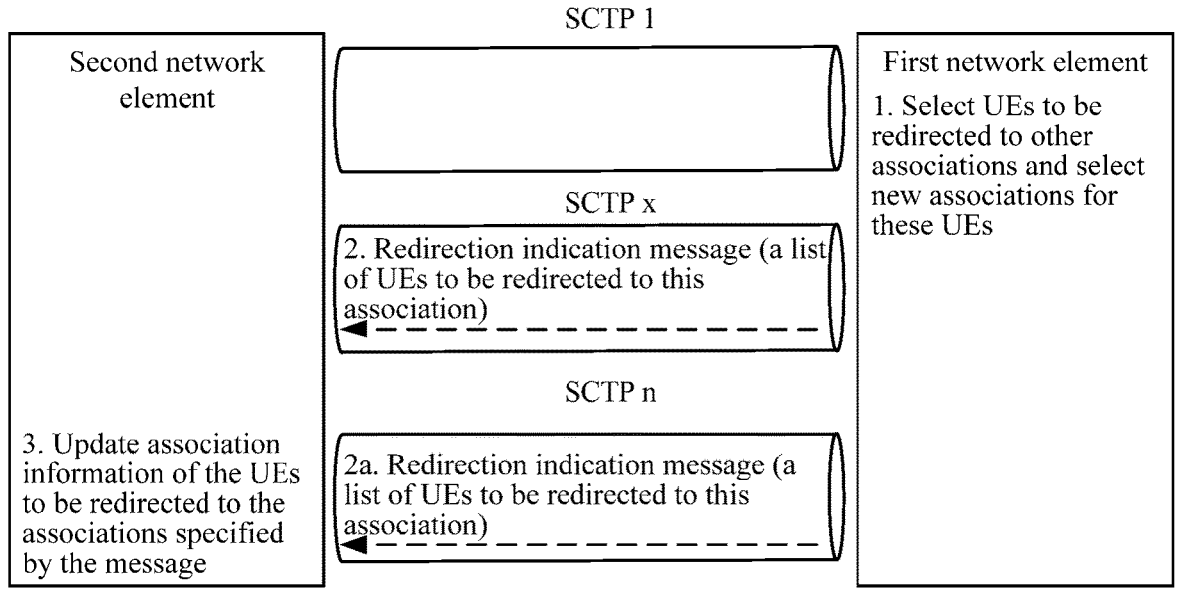
FIG. 10 is a processing diagram of mode two illustrating that a first network element triggers a steady-state UE to redirect the steady-state UE to another association of the first network element according to an embodiment of the present disclosure.

Additionally, FIG. 10 is a processing diagram of mode two illustrating that a first network element triggers a steady-state UE to redirect the steady-state UE to another association of the first network element according to an embodiment of the present disclosure. As shown in FIG. 10, that the first network element performs a migration on a user of an association to another association of the first network element may be implemented through the following manner: the first network element directly transmits a redirection indication message through a target association, where the redirection indication message carries a mode for redirecting to the association. Firstly, the first network element selects a list of users to be redirected to other associations, and selects target associations to which these users may be redirected. Then, these users are allocated to candidate associations according to an appropriate way, a redirection indication message is constructed and the redirection indication message carries a list of users allocated to associations, and the redirection indication message is transmitted to the second network element through the corresponding association. If multiple target associations are selected, a respective message is transmitted through each candidate association. Finally, the second network element modifies, according to the received respective redirection indication message, the corresponding transport association of the user to be an association receiving the message.

Figure 11:
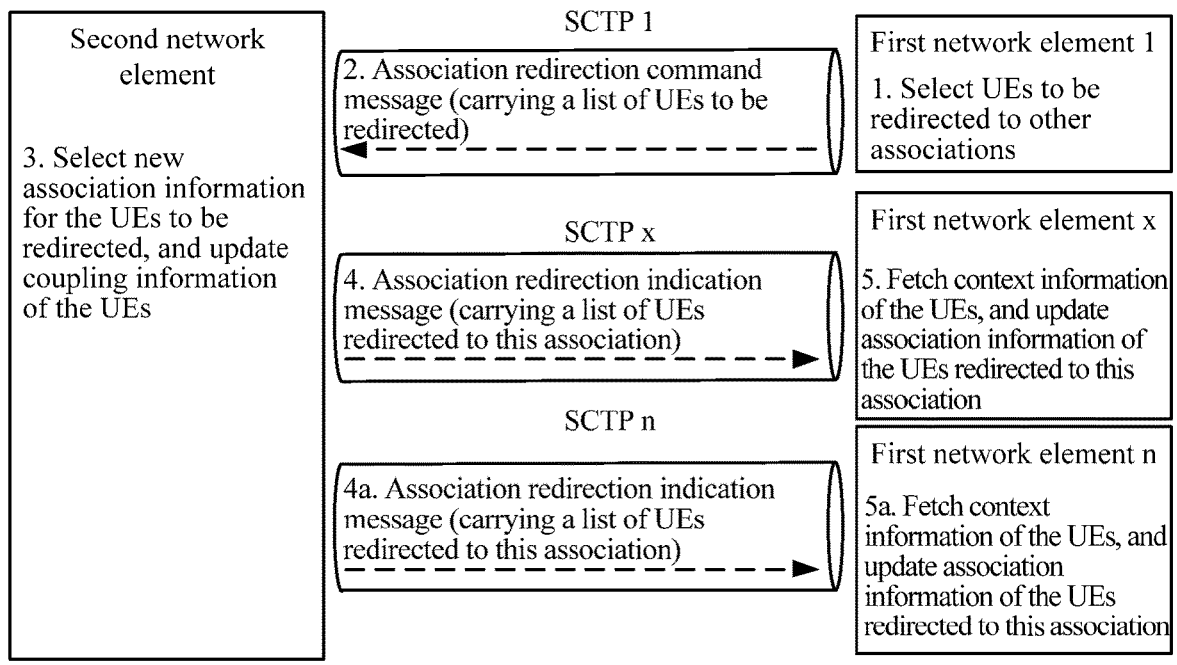
FIG. 11 is a processing diagram illustrating that a first network element triggers a steady-state UE to redirect the steady-state UE to another association between network elements according to an embodiment of the present disclosure.

FIG. 11 is a processing diagram illustrating that a first network element triggers a steady-state UE to redirect the steady-state UE to another association between network elements according to an embodiment of the present disclosure. As shown in FIG. 11, if UEs are redirected to other network elements of the same type as the first network element, such as first network elements x and n in FIG. 11, the first network element selects an information list of the UEs to be redirected to other network elements, constructs a redirection message and transmits the redirection message to a second network element. The message indicates that these UEs are to be performed a redirection between network elements. If these UEs belong to multiple associations of first network element 1, the first network element may summarize these UEs in one message to transmit, or may summarize theses UEs according to different associations and then transmit respective redirection messages through different associations to the second network element. The second network element receives the redirection request message, selects appropriate new associations according to the list of the UEs to be redirected and load information of associations of other network elements having the same type as the first network element and connected to the second network element, allocates the UEs to these new associations, and constructs a respective redirection indication message for each candidate new association to carry an information list of the allocated UEs and application identifiers of first network elements which serve the UEs, so that target network element may correctly fetch the context. Other examples for the first network element are included, such as a first network element x and a first network element n receive redirection response messages, fetch the context information of the UEs according to the first network element application identifiers in the messages and UE information in the information lists, and complete the association redirection operations for the UEs.

Similarly, if the first network element determines a target network element or a target association while selecting the UE to be redirected and is capable of notifying the target network element to update association information of the UE, the second network element does not need to transmit an association redirection indication message to notify the first network element, and it is not necessary to perform steps 4 and 4a of FIG. 11.

In this scenario, the embodiment of the present disclosure relates to two messages: a "redirection command" message and a "redirection indication" message.

The "redirection command" message is used for the first network element requiring the second network element to redirect a corresponding user to another association.

The "redirection command" message includes "redirection interface" information and/or "redirection association" information.

The "redirection interface" information includes a "redirection interface all-user" information element, a "redirection interface part-user" information element, a "user application identifier list" information element and a "target network element identifier list" information element.

When the "redirection interface all-user" information element is valid, all users in the first network element are redirected.

When the "redirection interface part-user" information element is valid, a part of users in the first network element is redirected.

The "user application identifier list" information element is configured to carry identifier information of a user to be redirected, and may include one or more pieces of user identifier information.

The "target network element identifier list" information element is an optional call and specifies a candidate target network element for redirecting. If the "target network element identifier list" is not specified, the second network element selects the network element of the same type as the first network element to serve as the candidate target network element according to a load.

The "redirection association" information includes a "redirection association all-user" information element, a "redirection association part-user" information element, a "user application identifier list" information element, a "target association list" information element and a "target network element identifier".

When the "redirection association all-user" information element is valid, it is indicated that all users on the association are redirected.

When the "redirection association part-user" information element is valid, it is indicated that a part of users on the association are redirected.

The "user application identifier list" information element is configured to carry identifier information of a user to be redirected and may and may include one or more pieces of user identifier information.

The "target association list" information element is valid when an association redirection within the network element is performed. A target association list carries information of a candidate target association.

When the target network element identifier is configured to be valid, an association redirection between network elements is performed, and a network element specified by a network element identifier list in the target association list is used as a candidate network element.

The "redirection indication" message is used for the second network element to indicate information of a user in the first network element to be redirected to the association. The "redirection indication" message includes one or more pieces of a "redirected-user list" information element or an "old-network-element application identifier" information element.

The "redirected-user list" information element carries an information list of a user redirected to the association and includes one or more pieces of user identifier information.

The "old-network-element application identifier" information element is configured to request UE context information from an old network element by a new network element in a scenario where a user is performed a cross-network element redirection.

According to the embodiments of the present disclosure, it can be implemented that a UE is redirected from an association to another association between multiple SCTP associations connected to multiple network elements of the same type, as well as between network elements that establish multiple SCTP association, so as to implement load balance between associations. The user can be dynamically migrated to a new association without interrupting user services when the association is out of service or a network element is out of service, so that the network robustness and availability are improved. Thus, it is supported that the on-demand addition and deletion of associations and flexible scaling of network element instances are implemented in a native cloud environment of the fifth generation network (5G).

The embodiments of the present disclosure relate to selection processes for an association within a network element and for an association between network elements. if the association within the network element is selected, a group of associations with lower loads may be selected according to the current load state of each SCTP association, and then a final service association is selected from this group of associations according to a respective weight factor configured by an application layer to each association and in accordance with a proportional fairness principle. If no weight factor is configured, a service association is selected by using a random fairness algorithm. If the association of another network element of the same type, a group of network elements with lower loads is selected according to a network-element load state between network elements of the same type, and then a final service network element is selected according to weight factors configured by the application layer to this group of network elements and in accordance with a proportional fairness principle. If the application layer does not configure the weight factors to network elements, a service network element is selected by using a random fairness algorithm. Then, the association is selected according to the selected network element and the method for selecting an association within a network element described above. Only one association or network element is selected each time in the preceding process. If multiple associations or multiple network elements are selected, the preceding process may be repeatedly performed, or multiple most appropriate network elements or associations may be selected each time.

Example one: an AMF, in a flow, triggers a UE to redirect the UE to a specified association within the network element.

Figure 12:
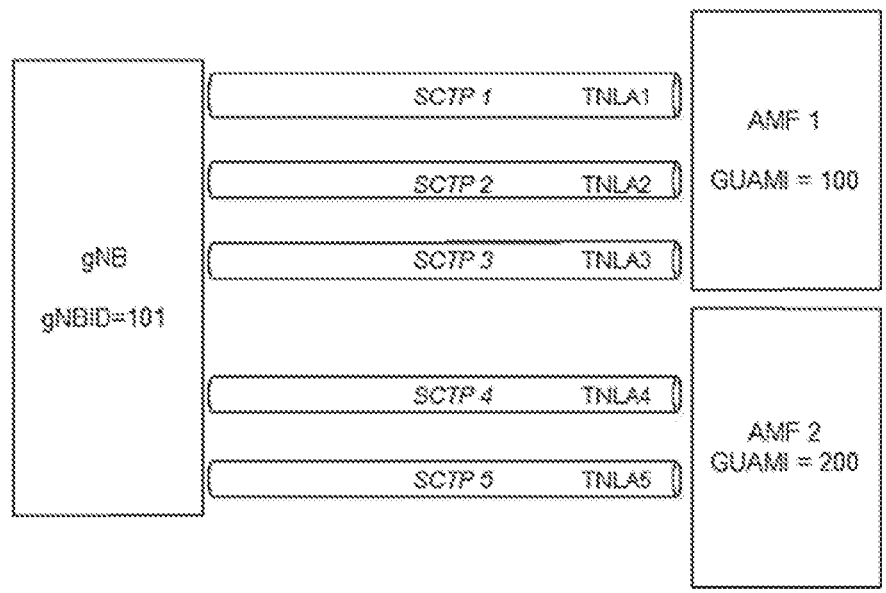
FIG. 12 is a schematic diagram of transmission networking of a Next Generation NodeB (gNB) and multiple associations of AMFs according to an embodiment of the present disclosure.

FIG. 12 is a schematic diagram of transmission networking of a gNB and multiple associations of AMFs according to an embodiment of the present disclosure. As shown in FIG. 12, in the networking structure, the gNB (with gNBID 101) is connected to two AMFs (AMF 1 and AMF 2 with global unique AMF identifiers (GUAMIs) 100 and 200, respectively), and the gNB establishes multiple transport SCTP associations with each AMF. Three associations SCTP 1, SCTP 2 and SCTP 3 are established between the gNB and AMF 1, and transport layer addresses at the AMF side are TNLA 1, TNLA 2 and TNLA 3, respectively. Two associations SCTP 4 and SCTP 5 are established between the gNB and AMF 2, and transport layer addresses at the AMF side are TNLA 4 and TNLA 5, respectively.

Figure 13:
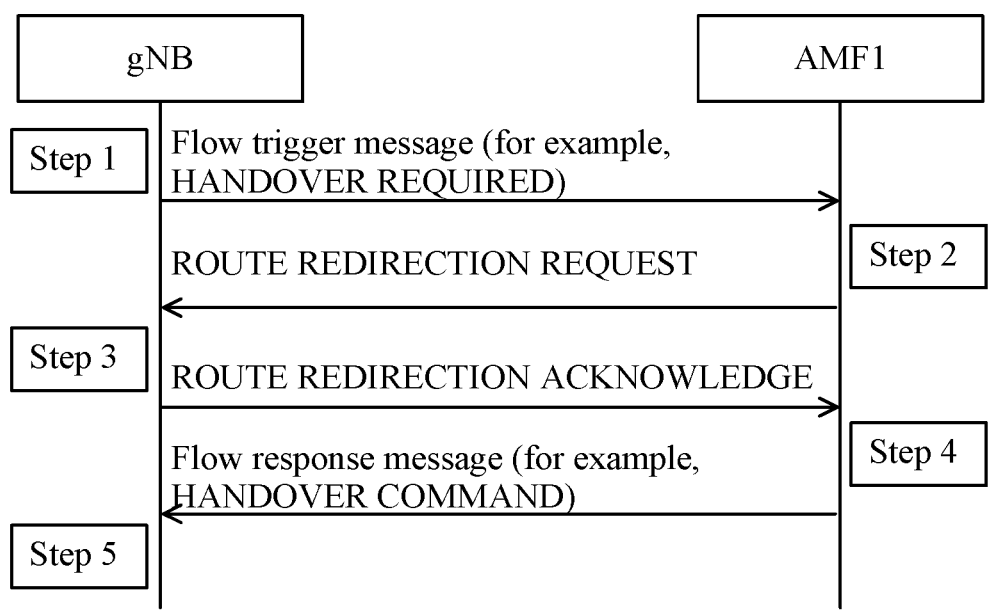
FIG. 13 is a cooperation diagram illustrating that an AMF triggers, in a flow, a gNB to redirect the gNB to an SCTP within a specified network element according to an embodiment of the present disclosure.

Assuming that a UE selects and accesses to association SCTP 1 through the gNB, if the gNB triggers a handover flow, AMF 1 instructs the gNB to change to SCTP 2. FIG. 13 is a cooperation diagram illustrating that an AMF triggers, in a flow, a gNB to redirect the gNB to an SCTP within a specified network element according to an embodiment of the present disclosure. As shown in FIG. 13, the process includes steps described below.

In step 1, the gNB transmits a HANDOVER REQUIRED message to AMF 1 through SCTP 1.

In step 2, in view of the load of SCTP 1 or other factors, AMF 1 decides to change a transport association of the UE to SCTP 2, and replies a ROUTE REDIRECTION REQUEST message to the gNB through SCTP 1. The message includes a "UE application identifier" information element carrying a gNB UE next generation application protocol (NGAP) identifier (ID) and an AMF UE NGAP ID, a "target association" information element carrying transport address TNLA 2 of SCTP 2, and an "unprocessed-message" information element carrying the HANDOVER REQUIRED message.

In step 3, the gNB receives the ROUTE REDIRECTION REQUEST message, and constructs a ROUTE REDIRECTION ACKNOWLEDGE message according to the "UE application identifier", the "target association" information and the "unprocessed message" to carry the unprocessed-message information element and a user identifier before the UE is redirected. Then, the gNB selects to deliver the ROUTE REDIRECTION ACKNOWLEDGE message to AMF 1 through SCTP 2 according to TNLA 2, and meanwhile, changes a subsequent transport association of the UE to SCTP 2.

In step 4, AMF 1 receives the ROUTE REDIRECTION ACKNOWLEDGE message and updates the transport association information of the UE, processes the message according to the "unprocessed-message" information element and a flow processing corresponding to the message, and updates the transport association of the UE to SCTP 2. The AMF may change the local UE application identifier, AMF UE NGAP ID, during this process.

In step 5, after the gNB receives a flow response message, if the AMF changes the UE application identifier, the gNB updates the UE application identifier.

Example two: an AMF triggers, in a flow, a UE to redirect the UE to another association within the network element.

A networking structure is shown in FIG. 12. An AMF triggers, in a flow trigger message, a UE to redirect the UE to another association within the network element, and does not specify the association. As shown in FIG. 13, the process flow includes steps described below.

In step 1, a gNB transmits a HANDOVER REQUIRED message to AMF 1 through SCTP 1.

In step 2, AMF 1 decides, according to the load of SCTP 1 or other factors, to change the UE to another transport association within the network element, and replies a ROUTE REDIRECTION REQUEST message to the gNB. The message includes a UE application identifier information element carrying a gNB NGAP ID and an AMF UE NGAP ID, a target association information element but not specifying TNLA information of an association, a target association information element but not specifying TNLA information of an association and an unprocessed message information element carrying the HANDOVER REQUIRED message.

In step 3, the gNB receives the ROUTE REDIRECTION REQUEST, and constructs a message ROUTE REDIRECTION ACKNOWLEDGE message according to the UE application identifier, the target association information and the unprocessed message to carry the unprocessed message and a user identifier before the UE is redirected. Then, the gNB selects the transport association, for example, SCTP 3, according to association loads of SCTP 2 and SCTP 3 of the AMF, and delivers the ROUTE REDIRECTION ACKNOWLEDGE message to AMF 1 through SCTP 3, meanwhile, changes a subsequent transport association of the UE to SCTP 3.

In step 4, AMF 1 receives the ROUTE REDIRECTION ACKNOWLEDGE message through SCTP 3 and updates the transport association information of the UE to SCTP 3, and processes the "unprocessed-message" information element according to a flow processing corresponding to the message. The AMF may change the local UE application identifier, AMF UE NGAP ID, during this process.

In step 5, after the gNB receives a flow response message, if the AMF changes the UE application identifier, the gNB updates the UE application identifier.

Example three: an AMF triggers, in a flow, a UE to redirect the UE to another AMF.

Figure 14:
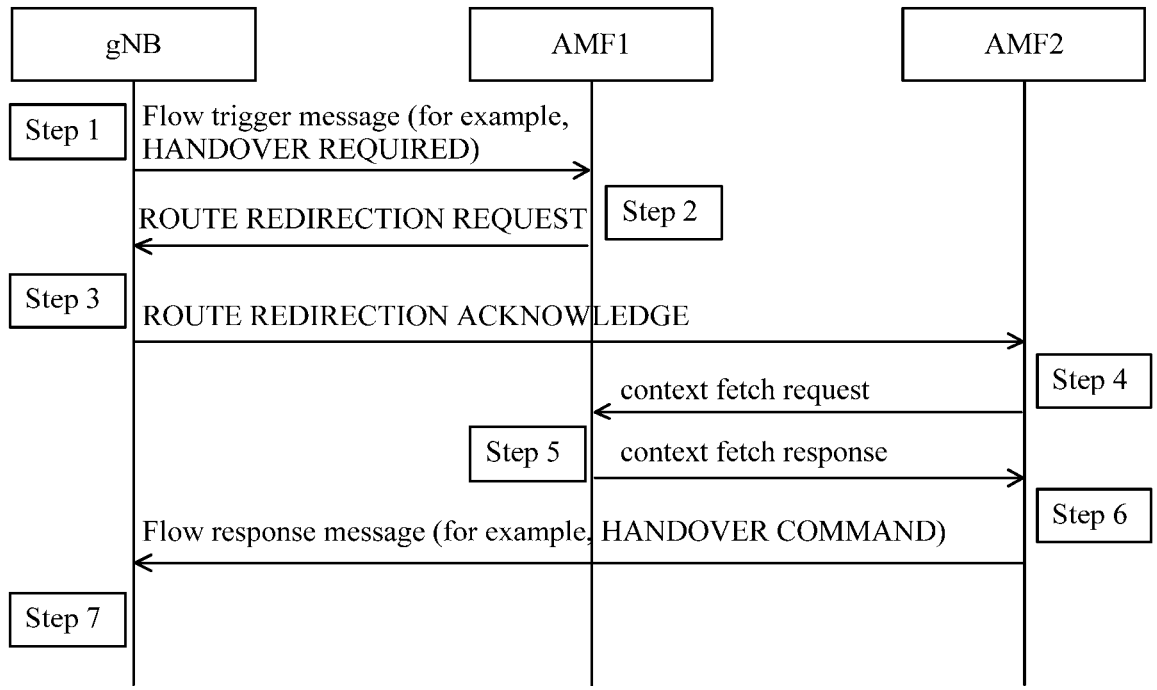
FIG. 14 is a cooperation diagram illustrating that an AMF triggers, in a flow, a gNB to redirect the gNB to another AMF according to an embodiment of the present disclosure.

A networking structure is shown in FIG. 12. AMF 1 triggers, in a flow trigger message, a UE to redirect the UE to another AMF. FIG. 14 is a cooperation diagram illustrating that an AMF triggers, in a flow, a gNB to redirect the gNB to another AMF according to an embodiment of the present disclosure. As shown in FIG. 14, the process flow includes steps described below.

In step 1, the gNB transmits a HANDOVER REQUIRED message to AMF 1 through SCTP 1.

In step 2, in view of the load of SCTP 1 or other factors, AMF 1 decides to change the UE to another AMF, and replies a ROUTE REDIRECTION REQUEST message to the gNB. The message includes a UE application identifier information element carrying a gNB NGAP ID and an AMF UE NGAP ID, a target interface information element but not specifying the GUAMI information of the AMF, and an unprocessed message information element including HANDOVER REQUIRED message code stream.

In step 3, the gNB receives the ROUTE REDIRECTION REQUEST message, and constructs a ROUTE REDIRECTION ACKNOWLEDGE message according to the UE application identifier, the target interface information and the unprocessed message code stream to carry a user identifier before the UE is redirected, the GUAMI information of AMF 1 the unprocessed message information element. Then, the gNB selects another appropriate AMF network element, for example, AMF 2, according to the AMF that the gNB is currently connected to, after excluding AMF 1. After that, the gNB selects an appropriate STCP association, for example, SCTP 5, according to loads of transport associations SCTP 4 and SCTP 5 between AMF 2 and the gNG or according to other factors, and delivers the ROUTE REDIRECTION ACKNOWLEDGE message to AMF 2 through SCTP 5, meanwhile, changes a subsequent transport association of the UE to SCTP 5.

In step 4, AMF 2 receives the ROUTE REDIRECTION ACKNOWLEDGE message through SCTP 5 and updates the transport association information of the UE to SCTP 5, transmits a context request to AMF 1 according to the GUAMI information in the message (the message includes an application identifier, such as the gNB NGAP ID and the AMF UE NGAP ID, of an original AMF of the UE), and fetches context information.

In step 5, AMF 1 receives the context request of AMF 2, searches for the context information of the UE according to the UE application layer identifier carried in the message, and replies a context response to AMF 2.

In step 6, AMF 2 performs a corresponding flow processing according to the "unprocessed-message" information element received in step 4. AMF 2 may change the local UE application identifier, AMF UE NGAP ID, during this process, and reply a flow response to the gNB.

In step 7, after the gNB receives the flow response message, if the AMF changes the UE application identifier, the gNB updates the UE application identifier.

The mode of fetching the context in steps 4 and 5 may be implemented by using distributed data and other shared storage modes, which are also within the scope of the embodiments of the present disclosure.

Example four: an AMF triggers, in a flow, a UE to redirect the UE to a specified AMF.

A networking structure is shown in FIG. 12. AMF 1 triggers, in a flow trigger message, a UE to redirect the UE to another AMF. As shown in FIG. 14, the process flow includes steps described below.

In step 1, a gNB transmits a HANDOVER REQUIRED message to AMF 1 through SCTP 1.

In step 2, in view of the load of AMF 1 or other factors, AMF 1 decides to change the UE to another AMF, for example, AMF 2, and replies a ROUTE REDIRECTION REQUEST message to the gNB. The message includes a UE application identifier information element carrying a gNB NGAP ID and an AMF UE NGAP ID, GUAMI information carrying a target interface information element and not specifying AMF 2, and an "unprocessed-message" information element carrying the HANDOVER REQUIRED message.

In step 3, the gNB receives the ROUTE REDIRECTION REQUEST message, and constructs a ROUTE REDIRECTION ACKNOWLEDGE message according to the UE application identifier, the target interface information and an unprocessed message code stream to carry a user identifier before the UE is redirected, GUAMI information of AMF 1 and the "unprocessed code stream" information element. Then, the gNB selects an appropriate SCTP association, for example, SCTP 5, according to AMF 2 that the gNB is currently connected to and on the basis of loads of transports associations SCTP 4 and SCTP 5 between AMF 2 and the gNB and other factors. The gNB delivers the ROUTE REDIRECTION ACKNOWLEDGE message to AMF 2 through SCTP 5, meanwhile, changes a subsequent transport association of the UE to SCTP 5.

In step 4, AMF 2 receives the ROUTE REDIRECTION ACKNOWLEDGE message through SCTP 5 and updates the transport association information of the UE to SCTP 5, transmits a context request to AMF 1 according to the GUAMI information in the message (the message includes an application identifier, such as the gNB NGAP ID and the AMF UE NGAP ID, of the original AMF of the UE), and fetches context information.

In step 5, AMF 1 receives the context request of AMF 2, searches for the context information of the UE according to the UE application layer identifier carried in the message, and replies a context response to AMF 2.

In step 6, AMF 2 performs a corresponding flow processing according to the "unprocessed-message" information element received in step 4. AMF 2 may change the local UE application identifier, AMF UE NGAP ID, during this process, and reply a flow response to the gNB.

In step 7, after the gNB receives the flow response message, if the AMF changes the UE application identifier, the gNB updates the UE application identifier.

The mode of fetching the context in steps 4 and 5 may be implemented by using distributed data and other shared storage modes, which are also within the scope of the embodiments of the present disclosure.

Example five: an AMF triggers a part of UEs on an association to redirect the part of UEs to a specified association of the network element.

Figure 15:
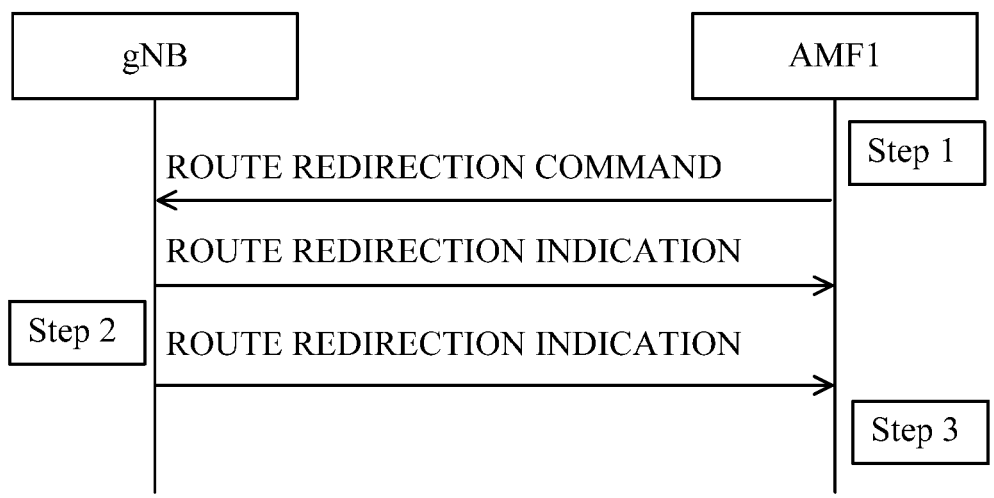
FIG. 15 is a cooperation diagram illustrating that an AMF triggers a UE on a steady-state association to redirect the UE between associations within the AMF according to an embodiment of the present disclosure.

A networking structure is shown in FIG. 12. Due to a high load of SCTP 1 and other factors, AMF 1 is to redirect a part of UEs on SCTP 1 to one or more specified SCTP associations within the network element. FIG. 15 is a cooperation diagram illustrating that an AMF triggers a UE on a steady-state association to redirect the UE between associations within the AMF according to an embodiment of the present disclosure. The process is described below.

In step 1, AMF 1 expects to redirect a part of UEs on SCTP 1 to other associations of AMF 1 according to traffic, the load of SCTP 1 and other factors. In view of user experience performance, AMF 1 may migrate these selected UEs to one or more associations such as SCTP 2 and SCTP 3, and construct a ROUTE REDIRECTION COMMAND message to instruct a gNB to redirect the users on the association to the one or more specified associations. The message is filled with following information elements: a "redirection association part-user" information element, where the "redirection association part-user" information element is filled with an application layer identifier (gNB UE NGAP ID and AMF UE NGAP ID) list of the UEs to be redirected, and an "association redirection target" information element, where the "association redirection target" information element includes a transport address TNLA 2 of target associations SCTP 2 for redirecting and a transport address TNLA 3 of target associations SCTP 3 for redirecting.

In step 2, the gNB selects and updates, according to a list of the UEs to be redirected in the ROUTE REDIRECTION COMMAND message, association information of the UEs to be redirected, allocates the UEs specified in the "redirection association part-user" information element to these candidate associations according to the "association redirection target", constructs a respective ROUTE REDIRECTION INDICATION message for each candidate association, where the respective message includes a list of a user redirected to each association, and transmits the respective messages to the AMF through each association.

In step 3, the AMF receives the ROUTE REDIRECTION INDICATION message and updates a transport association of the UE to the association receiving the message.

Example six: an AMF triggers a part of UEs on an association to redirect the part of UEs to another association of the network element.

A networking structure is shown in FIG. 12. Due to a high load of SCTP 1 and other factors, AMF 1 is to redirect a part of UEs on SCTP 1 to another SCTP association (which may be multiple associations) within the network element. As shown in FIG. 15, the process is described below.

In step 1, AMF 1 expects to redirect a part of UEs on SCTP 1 to another association of AMF 1 according to traffic, the load of SCTP 1 and other factors, and constructs a ROUTE REDIRECTION COMMAND message to instruct a gNB to redirect the specified UE on the association to another association within the network element. The message is filled with following information elements: a "redirection association part-user" information element, where the "redirection association part-user" information element is filled with an application layer identifier (gNB UE NGAP ID and AMF UE NGAP ID) list of the UEs to be redirected, and an "association redirection target" information element, where the "association redirection target" information element does not specify association information, and the gNB decides a candidate association.

In step 2, the gNB selects and updates, according to a list of the UEs to be redirected in the ROUTE REDIRECTION COMMAND message, the association information of the UEs to be redirected, selects a list of candidate associations, such as SCTP 2 and SCTP 3, for redirecting according to transport associations established between the gNB and AMF 1, allocates the UEs to be redirected to these candidate associations, allocates the UEs specified by the "redirection association part-user" to these candidate associations, constructs a respective ROUTE REDIRECTION INDICATION message for each candidate association, where the respective message includes a list of a user redirected to each association, and transmits the respective message to the AMF through each association.

In step 3, the AMF receives the ROUTE REDIRECTION INDICATION message and updates a transport association of the UE to the association receiving the respective message.

Example seven: an AMF triggers all UEs on an association to redirect all the UEs to a specified association of the network element.

A networking structure is shown in FIG. 12. Due to the maintenance for SCTP 1 and other factors, AMF 1 is to redirect all UEs on SCTP 1 to one or more specified SCTP associations within the network element. As shown in FIG. 15, the process is described below.

In step 1, AMF 1 expects to redirect all UEs on SCTP 1 to other associations of AMF 1 In view of the user experience, AMF 1 may migrate these UEs to be redirected to multiple associations such as SCTP 2 and SCTP 3, and construct a ROUTE REDIRECTION COMMAND message to instruct a gNB to redirect all users on the association to the specified associations. The message is filled with following information elements: a "redirection association all-user" information element, and an "association redirection target" information element, where the "association redirection target" information element includes a transport address TNLA 2 of target associations SCTP 2 for directing and a transport address TNLA 3 of target associations SCTP 3 for directing.

In step 2, the gNB selects all users on the association for redirecting according to that a redirection type included in the ROUTE REDIRECTION COMMAND message is association for all users, allocates the UEs to be redirected to these candidate associations according to the "association redirection target", and constructs a respective ROUTE REDIRECTION INDICATION message for each candidate association, where the respective message includes a list of a user redirected to each association, and transmits the respective message to the AMF through each association.

In step 3, the AMF receives the ROUTE REDIRECTION INDICATION message and updates a transport association of the UE to the association receiving the message.

Example eight: an AMF triggers all UEs on an association to redirect all the UEs to another association of the network element.

A networking structure is shown in FIG. 12. Due to the maintenance for STCP 1 and other factors, AMF 1 is to redirect all UEs on SCTP 1 to another SCTP association (which may be multiple associations) within the network element. As shown in FIG. 15, the process is described below.

In step 1, AMF 1 expects to redirect all UEs on SCTP 1 to another association of AMF 1, and constructs a ROUTE REDIRECTION COMMAND message to instruct a gNB to redirect all users on the association to other associations. The message is filled with following information elements: a "redirection association all-user" information element, and an "association redirection target" information element, where the "association redirection target" does not specify association information.

In step 2, the gNB selects all users on the association for redirecting according to that a redirection type included in the ROUTE REDIRECTION COMMAND message is association for all users, and selects a list of candidate associations for redirecting, such as SCTP 2 and/or SCTP 3, according to transport associations established between the gNB and AMF 1. The gNB allocates the UEs to be redirected to the associations in the list of candidate associations, constructs a respective message ROUTE REDIRECTION INDICATION for each candidate association, where respective message includes a list of a user to be redirected to each association, and transmits the respective message to AMF 1 through each association.

In step 3, the AMF receives the ROUTE REDIRECTION INDICATION message and updates a transport association of the UE to the association receiving the respective message.

Example nine: an AMF redirects a UE on an association to a specified association within the AMF.

Figure 16:
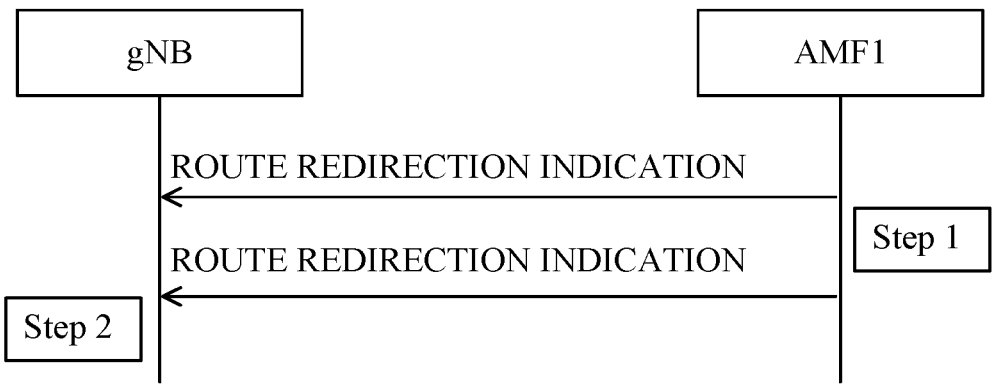
FIG. 16 is a cooperation diagram illustrating that an AMF redirects a UE on an association to a specified association within the AMF according to an embodiment of the present disclosure.

A networking structure is shown in FIG. 12. Due to the load of SCTP 1, maintenance and other factors, AMF 1 is to redirect a part of UEs or all UEs on SCTP 1 to one or more specified SCTP associations within the network element. FIG. 16 is a cooperation diagram illustrating that an AMF redirects a UE on an association to a specified association within the AMF according to an embodiment of the present disclosure. As shown in FIG. 16, the process is described below.

In step 1, AMF 1 expects to redirect a part of UEs or all UEs on SCTP 1 to another association of AMF 1 according the load of SCTP 1. In view of the user experience, AMF 1 may migrate these UEs to one or more associations such as SCTP 2 and/or SCTP 3, allocate the UEs on SCTP 1 and to be redirected to SCTP 2 and/or SCTP 3 according to a load or other factors, and construct a respective ROUTE REDIRECTION INDICATION message for each association, where the respective message includes an application layer identifier list of a user redirected to each association, and the list includes a gNB UE NGAP ID and an AMF UE NGAP ID. If the AMF expect to modify an AMU UE NGAP ID simultaneously, a New AMF UE NGAP ID is carried in the list element, and the AMF transmits the respective constructed message to the gNB through each association.

In step 2, the gNB updates a transport association of the UE to the association receiving the respective message according to that the information list of the UE to be redirected to the association included in the ROUTE REDIRECTION INDICATION message, and if the message carries a New AMF UE NGAP ID, replaces the AMF UE NGAP ID with the New AMF UE NGAP ID.

Figure 17:
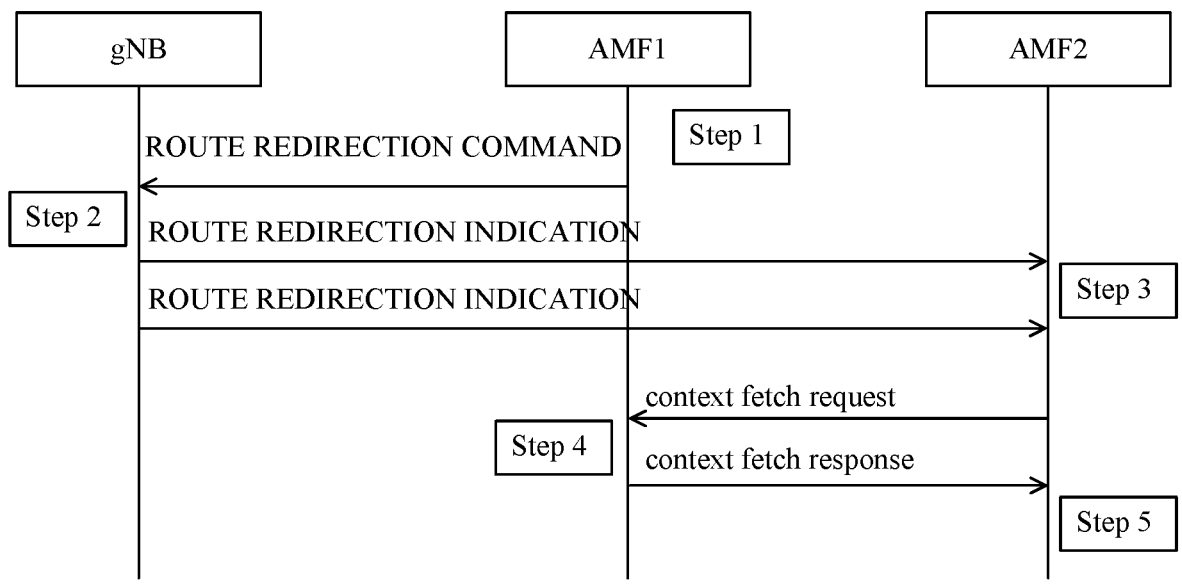
FIG. 17 is a processing and cooperation diagram illustrating that an AMF triggers a UE on an association to perform a cross-AMF redirection on the UE according to an embodiment of the present disclosure.

Example ten: an AMF triggers a part of UEs on an association to be redirected to another AMF A networking structure is shown in FIG. 12. Due to the load of a network element and other factors, AMF 1 is to redirect a part of UEs on SCTP 1 to another SCTP association (which may be multiple associations) within the network element. FIG. 17 is a processing and cooperation diagram illustrating that an AMF triggers a UE on an association to perform a cross-AMF redirection on the UE according to an embodiment of the present disclosure. As shown in FIG. 17, the process is described below.

In step 1, AMF 1 expects to redirect a part of UEs on SCTP 1 to an association of another AMF, and constructs a ROUTE REDIRECTION COMMAND message to instruct a gNB to redirect a part of UEs on the association to another association. The message is filled with following information elements: a "redirection association part-user" information element, where the "redirection association part-user" information element is filled with an application layer identifier (gNB UE NGAP ID and AMF UE NGAP ID) list of the UEs to be redirected, and an "association redirection target" information element, where the "association redirection target" information element does not specify network element identifier information.

In step 2, the gNB uses the part of UEs referred in the "redirection association part-user" information element included in the ROUTE REDIRECTION COMMAND message to serve as candidate UEs to be redirected, selects, according to transport associations established between the gNB and another AMF, a list of redirection candidate associations, for example, associations SCTP 4 and SCTP 5 of AMF 2 (where there may be one or more AMFs and one or more associations of each AMF). The gNB allocates the candidate UEs to be redirected to the candidate in the list of candidate associations, and constructs a respective ROUTE REDIRECTION INDICATION message for each association, where the respective message includes a list of a user redirected to each association and GUAMI information is specified in an "old-network-element application-identifier" information element, and transmits the respective message to AMF 2 through each association.

In step 3, AMF 2 receives the ROUTE REDIRECTION INDICATION message and updates a transport association of the UE to the association receiving the respective message, and for each user, AMF 2 requests the context of each UE according an application identifier of each UE and the GUAMI information of AMF 1.

In step 4, AMF 1 fetches the context information of the UE according to a context application identifier of the UE and replies a context response to AMF 2, and meanwhile, AMF 1 clears the context information of the UE.

In step 5, after fetching the context information of the UE, AMF 2 updates association information and the application identifier of the UE, and when receiving a UE message of the gNB next time, the UE message of the gNB still carries an application identifier of a UE allocated by the AMF 1 side.

For the process of fetching the UE context in steps 3 and 4, the mode of fetching the context through distributed database storage and the like is also within the scope of the embodiments of the present disclosure. For the user to be redirected, the gNB may carry a new UE application identifier allocated by the AMF 2 side in a message subsequently transmitted by AMF 2 to the gNB, and the gNB needs to update the application identifier of the UE in time.

Example eleven: an AMF triggers all UEs on an association to redirect all the UEs to a specified AMF.

A networking structure is shown in FIG. 12. Due to maintenance for SCTP 1 and other factors, AMF 1 is to redirect all UEs on SCTP 1 to another AMF (which may be multiple associations). As shown in FIG. 17, the process is described below.

In step 1, AMF 1 expects to redirect all UEs on SCTP 1 to an association of another AMF, and constructs a ROUTE REDIRECTION COMMAND message to instruct a gNB to redirect all users to another association. The message is filled with following information elements: a "redirection association all-user" information element, and an "association redirection target" information element, where the "association redirection target" information element does not specify the network element identifier information, for example, GUAMI of AMF 2.

In step 2, the gNB redirects all users on the association to a new AMF 2 according to the ROUTE REDIRECTION COMMAND message, and selects a list of candidate associations to be redirected, for example, SCTP 4 and/or SCTP 5, according to transport associations established between the gNB and AMF 2. The gNB allocates the UEs to be redirected to the associations in the list of the candidate associations, and constructs a respective ROUTE REDIRECTION INDICATION message for each association, where the respective message includes a list of a user redirected to each association and GUAMI information of AMF 1 is specified in an "old-network-element application-identifier" information element. The gNB transmits the respective message to the AMF through each association.

In step 3, AMF 2 receives the ROUTE REDIRECTION INDICATION message and updates a transport association of the UE to the association receiving the message, and for each user, AMF 2 requests the context of each UE according an application identifier of each UE and the GUAMI information of AMF 1.

In step 4, AMF 1 fetches the context information of the UE according to a context application identifier of the UE and replies a context response to AMF 2, and meanwhile, AMF 1 clears the context information of the UE.

In step 5, after fetching the context information of the UE, AMF 2 updates association information of the UE and updates the application identifier of the UE, and when receiving a UE message of the gNB next time, the UE message of the gNB still carries an application identifier of a UE allocated by the AMF 1 side.

For the process of fetching the UE context in steps 3 and 4, the mode of fetching the context through distributed database storage and the like is also within the scope of the embodiments of the present disclosure. For the user to be redirected, the gNB may carry a new UE application identifier allocated by the AMF 2 side in a message subsequently transmitted by AMF 2 to the gNB, and the gNB needs to update the application identifier of the UE in time.

Example twelve: an AMF triggers all users of the network element to redirect all the users to another AMF.

A networking structure is shown in FIG. 12. In view of maintenance, upgrading and other requirements, AMF 1 may be shut down to avoid affecting UEs that have accessed to AMF 1, and the users of AMF 1 are to be migrated to another AMF, for example, AMF 2. As shown in FIG. 17, the process is described below.

In step 1, AMF 1 expects to redirect the UEs that access to the network element to another network element of the same type, and transmits a ROUTE REDIRECTION COMMAND message (that is, corresponding to an AMF status indication message in the standard) to the gNB. The message is filled with following information elements: a "redirection interface all-user" information element and an "interface redirection target" information element, where if AMF 1 expects to redirect the UEs to a specified AMF (that is, corresponding to a backup AMF name in the standard) (one or more AMFs), the "interface redirection target" information element specifies network element identifier information, for example, GUAMI of AMF 2, and otherwise, the "interface redirection target" information element is not filled, and the gNB autonomously decides a redirection target AMF. AMF 1 may select any one of multiple SCTP associations of gNB 1 to transmit the ROUTE REDIRECTION COMMAND message to the gNB.

If the users within AMF 1 are from multiple different gNBs, the AMF separately transmits the ROUTE REDDIRECTION COMMAND message to each gNB once.

In step 2, the gNB selects all users that access to AMF 1 as the users to be redirected according to the content of the ROUTE REDIRECTION COMMAND message and the "redirection interface all-user" information element.

If the "interface redirection target" information element specifies AMFs, candidate network elements for redirecting are selected according to GUAMI of the AMFs. If the "interface redirection target" information element does not specify the AMFs, the gNB selects other AMFs in connections to the gNB to serve as the candidate network elements according to a load or other traffic factors, and then selects candidate associations from these candidate network elements according to the selected candidate network elements.

The users to be redirected are allocated to these candidate associations. A respective ROUTE REDIRECTION INDICATION message is constructed for each candidate association. A "redirected-user list" information element carries an information list of a UE allocated to each association, where information of each UE includes an application layer identifier (such as a gNB UE NGAP ID and an AMF UE NGAP ID) of each UE. An "old-network-element application-identifier" information element is filled with GUAMI information of an original AMF which serves each UE, for example, GUAMI information of AMF 1. The respective message is transmitted to a new AMF, for example, AMF 2, through each candidate association.

In step 3, AMF 2 receives the ROUTE REDIRECTION INDICATION message and updates a transport association of the UE to the association receiving the respective message, and for each UE, AMF 2 requests the context of each UE according to the application identifier of each UE and the GUAMI of AMF 1.

In step 4, AMF 1 fetches the context information of the UE according to a context application identifier of the UE and replies a context response to AMF 2, and meanwhile, AMF 1 clears the context information of the UE.

In step 5, after fetching the context information of the UE, AMF 2 updates association information and the application identifier of the UE, and when receiving a UE message of the gNB next time, the UE message of the gNB still carries an application identifier of a UE allocated by the AMF 1 side.

For the process of fetching the UE context in steps 3 and 4, the mode of fetching the context through distributed database storage and the like is also within the scope of the embodiments of the present disclosure. For the user to be redirected, the gNB may carry a new UE application identifier allocated by the AMF 2 side in a message subsequently transmitted by AMF 2 to the gNB, and the gNB needs to update the application identifier of the UE in time.

Example thirteen: a gNB triggers, in an unlink message, a UE to perform an association redirection on the UE.

Figure 18:
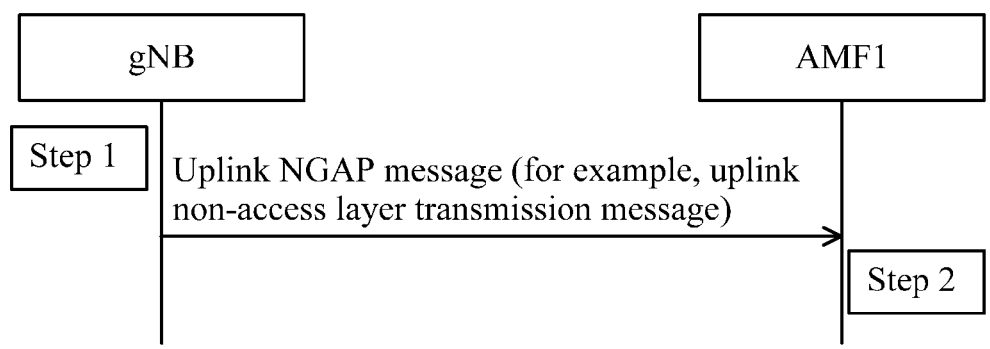
FIG. 18 is a cooperation diagram illustrating that a gNB triggers, in an uplink message, a UE to perform an association redirection on the UE according to an embodiment of the present disclosure.

A networking structure is shown in FIG. 12. Assuming that a UE has accessed to SCTP 1, if a gNB determines to update a service association of the UE, the gNB may change the transport association when transmitting an uplink message to an AMF to achieve the association redirection. FIG. 18 is a cooperation diagram illustrating that a gNB triggers, in an uplink message, a UE to perform an association redirection on the UE according to an embodiment of the present disclosure. As shown in FIG. 18, the process is described below.

In step 1, when the uplink message is transmitted, the gNB decides to change the association of the UE from SCTP 1 to another association, the gNB selects an appropriate association for the UE, where the association may be another association of AMF 1 or an association of another AMF, and the gNB delivers the message through the newly selected association.

In step 2, when an AMF receives the message through the new association, it is regards that the gNB decides to update the transport association of the UE, thus the AMF updates a transport association of the UE to the association receiving the message. In an embodiment, the AMF fetches the context from the AMF to which the original association serving the UE belongs.

Example fourteen: a UE redirection triggered by a gNB

Figure 19:
FIG. 19 is a processing and cooperation diagram of a UE redirection triggered by a gNB according to an embodiment of the present disclosure.

A networking structure is shown in FIG. 12. A gNB may expect to migrate a UE that accesses to a certain association or a certain AMF to another association or another AMF. FIG. 19 is a processing and cooperation diagram of a UE redirection triggered by a gNB according to an embodiment of the present disclosure. As shown in FIG. 19, the process is described below.

In step 1, the gNB selects corresponding transport associations for UEs (there may be one or more UEs) to be redirected, constructs a ROUTE REDIRECTION INDICATION message, where the message carry a "redirected user list" that includes information (gNB UE NGAP ID and UMF UE NGAP ID) of these selected UEs to be redirected, and if a selected user changes the AMF, the message carries an "old-network-element application-identifier" information element that includes GUAMI information of the original AMF which serves the UE. Then, the gNB delivers the message through target associations for redirecting.

In step 2, an AMF receives the ROUTE REDIRECTION INDICATION message through the new associations and updates a transport association of the UE carried in the message to the association receiving the message, and if the message carries the "old-network-element application-identifier" information element, fetches context information of the UE from the original AMF.

Embodiment Four

Figure 20:
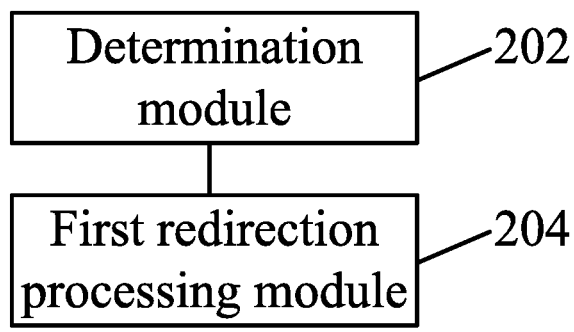
FIG. 20 is a block diagram of an association redirection apparatus according to an embodiment of the present disclosure.

Another embodiment of the present disclosure further provides an association redirection apparatus, which is applied to a first network element. FIG. 20 is a block diagram of an association redirection apparatus according to an embodiment of the present disclosure. As shown in FIG. 20, the apparatus includes a determination module 202 and a first redirection processing module 204.

The determination module 202 is configured to determine a trigger mode for triggering an association redirection of a UE.

The first redirection processing module 204 is configured to perform the association redirection on the UE according to the determined trigger mode.

Embodiment Five

Figure 21:
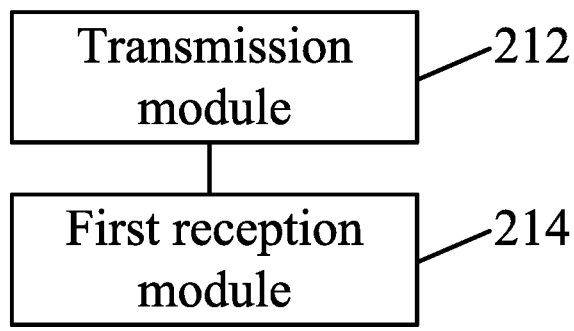
FIG. 21 is a block diagram of another association redirection apparatus according to an embodiment of the present disclosure.

Another embodiment of the present disclosure further provides an association redirection apparatus, which is applied to a second network element. FIG. 21 is a block diagram of another association redirection apparatus according to an embodiment of the present disclosure. As shown in FIG. 21, the apparatus includes a transmission module 212 and a first reception module 214.

The transmission module 212 is configured to transmit an initial trigger message of a traffic flow of a UE to a first network element.

The first reception module 214 is configured to receive a redirection request fed back by the first network element through an association receiving the initial trigger message, and redirect the UE to a new association according to the redirection request; or receive a redirection acknowledgement transmitted by the first network element through the new association, where the redirection acknowledgement carries prompt information that the first network element has redirected the UE to the new association.

Embodiment Six

Figure 22:
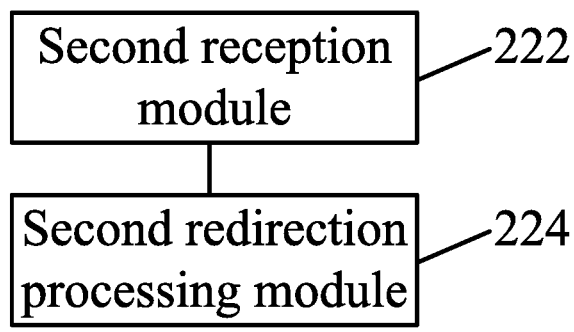
FIG. 22 is a block diagram of another association redirection apparatus according to an embodiment of the present disclosure.

Another embodiment of the present disclosure further provides an association redirection apparatus, which is applied to a second network element. FIG. 22 is a block diagram of another association redirection apparatus according to an embodiment of the present disclosure. As shown in FIG. 22, the apparatus includes a second reception module 222 and a second redirection processing module 224.

The second reception module 222 is configured to receive a redirection command transmitted by a first network element through a new association. The redirection command includes an information list of a UE to be redirected to the new association.

The second redirection processing module 224 is configured to perform an association redirection on the UE according to the redirection command.

Embodiment Seven

An embodiment of the present disclosure further provides a storage medium. The storage medium includes stored programs. The programs, when executed, perform the method of any one of the embodiments described above.

In an embodiment, the storage medium may be configured to store program codes for performing steps described below.

In step 110, a first network element determines a trigger mode for triggering an association redirection of a UE.

In step 120, the first network element performs the association redirection on the UE according to the determined trigger mode.

In an embodiment, the storage medium may further be configured to store program codes for performing steps described below.

In step 210, a second network element transmits an initial trigger message of a traffic flow of a UE to a first network element.

In step 220, the second network element receives a redirection request fed back by the first network element through an association receiving the initial trigger message, and redirects the UE to a new association according to the redirection request.

Alternatively, the second network element receives a redirection acknowledgement transmitted by the first network element through the new association. The redirection acknowledgement carries prompt information that the first network element has redirected the UE to the new association In an embodiment, the storage medium may be further configured to store program codes for performing steps described below.

In step 310, a second network element receives a redirection command transmitted by a first network element through a new association. The redirection command includes an information list of a UE to be redirected to the new association.

In step 320, the second network element performs an association redirection on the UE according to the redirection command.

In an embodiment, the storage medium may include, but is not limited to, a universal serial bus (USB) flash disk, a read-only memory (ROM), a random access memory (RAM), a mobile hard disk, a magnetic disk, an optical disk or another medium capable of storing program codes.

Embodiment Eight

An embodiment of the present disclosure further provides a processor. The processor is configured to execute programs. The programs, when executed, perform the steps of the method of any one of the embodiments described above.

In an embodiment, the programs are configured to perform steps described below.

In step 410, a first network element determines a trigger mode for triggering an association redirection of a UE.

In step 420, the first network element performs the association redirection on the UE according to the determined trigger mode.

In an embodiment, the programs are further configured to perform steps described below.

In step 510, a second network element transmits an initial trigger message of a traffic flow of a UE to a first network element.

In step 520, the second network element receives a redirection request fed back by the first network element through an association receiving the initial trigger message, and redirects the UE to a new association according to the redirection request. Alternatively, the second network element receives a redirection acknowledgement transmitted by the first network element through the new association, where the redirection acknowledgement carries prompt information that the first network element has redirected the UE to the new association.

In an embodiment, the programs are further configured to perform steps described below.

In step 610, a second network element receives a redirection command transmitted by a first network element through a new association. The redirection command includes an information list of a UE to be redirected to the new association.

In step 620, the second network element performs an association redirection on the UE according to the redirection command.

In an embodiment, examples of this embodiment may refer to the examples in the embodiments and implementation modes described above, which will not be repeated here.

Apparently, those skilled in the art should know that one or more modules of the present application or one ore more steps of the present application described above may be implemented by a general-purpose computing device, the modules or steps may be concentrated on a single computing device or distributed on a network formed by two computing devices, and in an embodiment, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into one or more integrated circuit modules separately, or two modules or steps therein may be made into a single integrated circuit module for implementation. In this way, the present disclosure is not limited to any specific combination of hardware and software.

What is claimed is:

1. A stream control transmission protocol (SCTP) association redirection method, comprising:
   determining, by a first network element, whether an initial trigger message of a traffic flow of a user equipment (UE) transmitted by a second network element is received;
   in response to determining that the initial trigger message of the traffic flow of the UE transmitted by the second network element is received and the initial trigger message of the traffic flow of the UE is transmitted through a new SCTP association after the second network element redirects the UE to the new SCTP association, updating, by the first network element, SCTP association information of the UE to the new SCTP association; and
   in response to determining that the initial trigger message of the traffic flow of the UE transmitted by the second network element is not received and the UE is in a flow steady state, performing, by the first network element, an SCTP association redirection on the UE according to a factor related to the first network element, wherein the flow steady state means that the UE has established contexts in the first network element and the second network element and has no traffic flow to process.

2. The method of claim 1, wherein in response to determining that the initial trigger message of the traffic flow of the UE transmitted by the second network element is not received and the UE is in the flow steady state, performing, by the first network element, the SCTP association redirection on the UE according to the factor related to the first network element comprises:
   determining, by the first network element, a redirection type for redirecting the UE to a new SCTP association according to the factor related to the first network element; and
   performing, by the first network element, the SCTP association redirection on the UE according to the redirection type;
   wherein the redirection type comprises:
   redirecting the UE on an SCTP association of the first network element to a new SCTP association of the first network element; and
   redirecting the UE on an SCTP association of the first network element to an SCTP association of a network element of a same type as the first network element.

3. The method of claim 2, wherein the first network element determines the redirection type for redirecting the UE to the new SCTP association according to the factor related to the first network element in one of following manners:
   determining, by the first network element, the redirection type is to redirect a part of UEs on a high-load SCTP association of the first network element to a new low-load SCTP association of the first network element according to a load of the SCTP association of the first network element; or
   determining, by the first network element, an SCTP association to be shut down of the first network element on a basis of maintenance or traffic requirements, and determining, by the first network element, the redirection type is to redirect all UEs on the SCTP association to be shut down to a new SCTP association of the first network element.

4. The method of claim 2, wherein the first network element determines the redirection type for redirecting the UE to the new SCTP association according to the factor related to the first network element in one of following manners:
   detecting, by the first network element, that a load of the first network element is greater than a preset value, and determining, by the first network element, the redirection type is to redirect the UE of the first network element to an SCTP association of the network element of the same type as the first network element; or
   determining, by the first network element on a basis of maintenance or traffic requirements, to shut down or stop the first network element, and determining, by the first network element, the redirection type is to redirect the UE of the first network element to an SCTP association of the network element of the same type as the first network element;
   wherein performing, by the first network element, the SCTP association redirection on the UE according to the redirection type comprises:
   transmitting, by the first network element, a redirection command to the second network element to enable the second network element to redirect the UE to an SCTP association of the network element of the same type as the first network element, wherein the redirection command carries an information list of the UE to be redirected to the SCTP association of the network element of the same type as the first network element, and the redirection command is used for indicating the UE to be performed an SCTP association redirection between network elements.

5. The method of claim 3, wherein performing, by the first network element, the SCTP association redirection on the UE according to the redirection type comprises one of the followings:
   selecting, by the first network element, a UE on the SCTP association of the first network element and to be redirected to a new SCTP association of the first network element; and transmitting, by the first network element, a redirection command to the second network element through the SCTP association of the first network element to enable the second network element to redirect the UE to the new SCTP association of the first network element, wherein the redirection command comprises an information list of the UE to be redirected to the new SCTP association and indicates a redirection between SCTP associations of the first network element;
   selecting, by the first network element, a UE on the SCTP association of the first network element and to be redirected to a new SCTP association of the first network element and the new SCTP association of the first network element transmitting, by the first network element, the redirection command to the second network element to enable the second network element to redirect the UE to the new SCTP association of the first network element, and updating, by the first network element, the SCTP association information of the UE; or
   selecting, by the first network element, an information list of the UE on the SCTP association of the first network element and to be redirected to a new SCTP association of the first network element, and selecting the new SCTP association of the first network element to which the UE is redirected; and allocating, by the first network element, the UE to the new SCTP association, and transmitting, by the first network element, a redirection indication to the second network element through the new SCTP association, wherein the redirection indication carries the information list of the UE on which the SCTP association redirection is completed; wherein the redirection indication comprises at least one of:
- a redirected-user list information element, which carries an information list of a UE redirected to an SCTP association, and comprises at least one piece of UE identifier information; or
- an old-network-element application-identifier information element, which is configured to request UE context information from an old network element by a new network element in a scenario where a UE is performed a cross-network element redirection.

6. The method of claim 5, wherein the redirection command comprises at least one of redirection interface information or redirection association information.

7. The method of claim 6, wherein the redirection interface information comprises one of:
- a redirection interface all-user information element, wherein in a case where the redirection interface all-user information element is valid, all UEs in the first network element are redirected;
- a redirection interface part-user information element, wherein in a case where the redirection interface part-user information element is valid, a part of UEs in the first network element is redirected;
- a user application identifier list information element, which is configured to carry identifier information of a UE to be redirected and comprises at least one piece of UE identifier information; or
- a target network element identifier list information element, which specifies a candidate target network element for redirecting, wherein in a case where the target network element identifier list is not specified, the second network element selects, according to a load, the network element of the same type as the first network element to serve as the candidate target network element.

8. The method of claim 6, wherein the redirection association information comprises at least one of:
- a redirection association all-user information element, wherein in a case where the redirection association all-user information element is valid, all UEs on the SCTP association of the first network element are redirected;
- a redirection association part-user information element, wherein in a case where the redirection association part-user information element is valid, a part of UEs on the SCTP association of the first network element is redirected;
- a user application identifier list information element, which is configured to carry identifier information of a UE to be redirected on the SCTP association of the first network element and comprises at least one piece of user identifier information;
- a target association list information element, wherein the target SCTP association list information element is valid in a case where an SCTP association redirection within the first network element is performed, and a target SCTP association list carries information of a candidate target SCTP association; or
- a target network element identifier, wherein in a case where the target network element identifier is configured to be valid, an SCTP association redirection between network elements is performed and a network element specified by a target network element identifier list in the target SCTP association list is used as a candidate network element.

9. A stream control transmission protocol (SCTP) association redirection apparatus, which is applied to a first network element and comprises: a processor, and a memory, wherein the memory stores processor-executable programs, and the processor executes the programs to perform the SCTP association redirection method of claim 1.

10. A non-transitory storage medium, which comprises stored programs, wherein the programs, when executed, perform the method of claim 1.

* * * * *